US009874922B2

(12) United States Patent
Varma et al.

(10) Patent No.: US 9,874,922 B2
(45) Date of Patent: Jan. 23, 2018

(54) PERFORMING DYNAMIC POWER CONTROL OF PLATFORM DEVICES

(71) Applicant: Intel Corporation, Santa Clara, CA (US)

(72) Inventors: Ankush Varma, Hillsboro, OR (US); Krishnakanth V. Sistla, Beaverton, OR (US); Vasudevan Srinivasan, Hillsboro, OR (US); Eugene Gorbatov, Hillsboro, OR (US); Andrew D. Henroid, Portland, OR (US); Barnes Cooper, Tigard, OR (US); David W. Browning, Beaverton, OR (US); Guy M. Therien, Beaverton, OR (US); Neil W. Songer, Santa Clara, CA (US); James G. Hermerding, II, Vancouver, WA (US)

(73) Assignee: Intel Corporation, Santa Clara, CA (US)

( * ) Notice: Subject to any disclaimer, the term of this patent is extended or adjusted under 35 U.S.C. 154(b) by 148 days.

(21) Appl. No.: 14/623,764

(22) Filed: Feb. 17, 2015

(65) Prior Publication Data
US 2016/0239068 A1    Aug. 18, 2016

(51) Int. Cl.
*G06F 1/32* (2006.01)
*G06F 9/50* (2006.01)

(52) U.S. Cl.
CPC .......... *G06F 1/3206* (2013.01); *G06F 1/3203* (2013.01); *G06F 1/3287* (2013.01); *G06F 9/50* (2013.01); *Y02B 60/1282* (2013.01)

(58) Field of Classification Search
CPC .................................................. G06F 1/3206
See application file for complete search history.

(56) References Cited

U.S. PATENT DOCUMENTS 5,163,153 A    11/1992    Cole et al.
5,522,087 A    5/1996    Hsiang
(Continued)

FOREIGN PATENT DOCUMENTS

| EP | 1 282 030 A1 | 5/2003 |
| EP | 1909401 | 4/2008 |
| TW | 201428476 A | 7/2014 |

OTHER PUBLICATIONS

International Searching Authority, "Notification of Transmittal of the International Search Report and the Written Opinion of the International Searching Authority," dated May 19, 2016 in International application No. PCT/US2016/015075.
(Continued)

*Primary Examiner* — Thomas Lee
*Assistant Examiner* — Chad Erdman
(74) *Attorney, Agent, or Firm* — Trop, Pruner and Hu, P.C.

(57) ABSTRACT

In one embodiment, a processor includes at least one core to execute instructions and a power control logic to receive power capability information from a plurality of devices to couple to the processor and allocate a platform power budget to the devices, set a first power level for the devices at which the corresponding device is allocated to be powered, communicate the first power level to the devices, and dynamically reduce a first power to be allocated to a first device and increase a second power to be allocated to a second device responsive to a request from the second device for a higher power level. Other embodiments are described and claimed.

21 Claims, 19 Drawing Sheets

(56) References Cited

U.S. PATENT DOCUMENTS

| | | | |
|---|---|---|---|
| 5,590,341 A | 12/1996 | Matter | |
| 5,621,250 A | 4/1997 | Kim | |
| 5,931,950 A | 8/1999 | Hsu | |
| 6,167,524 A * | 12/2000 | Goodnow | G06F 9/3836 |
| | | | 712/E9.049 |
| 6,748,546 B1 | 6/2004 | Mirov et al. | |
| 6,792,392 B1 | 9/2004 | Knight | |
| 6,823,516 B1 | 11/2004 | Cooper | |
| 6,829,713 B2 | 12/2004 | Cooper et al. | |
| 6,996,728 B2 | 2/2006 | Singh | |
| 7,010,708 B2 | 3/2006 | Ma | |
| 7,043,649 B2 | 5/2006 | Terrell | |
| 7,093,147 B2 | 8/2006 | Farkas et al. | |
| 7,111,179 B1 | 9/2006 | Girson et al. | |
| 7,194,643 B2 | 3/2007 | Gonzalez et al. | |
| 7,272,730 B1 | 9/2007 | Acquaviva et al. | |
| 7,412,615 B2 | 8/2008 | Yokota et al. | |
| 7,434,073 B2 | 10/2008 | Magklis | |
| 7,437,270 B2 | 10/2008 | Song et al. | |
| 7,454,632 B2 | 11/2008 | Kardach et al. | |
| 7,529,956 B2 | 5/2009 | Stufflebeam | |
| 7,539,885 B2 | 5/2009 | Ma | |
| 7,730,340 B2 | 6/2010 | Hu et al. | |
| 9,411,390 B2 * | 8/2016 | Smith | G06F 1/3203 |
| 2001/0044909 A1 | 11/2001 | Oh et al. | |
| 2002/0194509 A1 | 12/2002 | Plante et al. | |
| 2003/0061383 A1 | 3/2003 | Zilka | |
| 2004/0064752 A1 | 4/2004 | Kazachinsky et al. | |
| 2004/0098560 A1 | 5/2004 | Storvik et al. | |
| 2004/0139356 A1 | 7/2004 | Ma | |
| 2004/0268166 A1 | 12/2004 | Farkas et al. | |
| 2005/0022038 A1 | 1/2005 | Kaushik et al. | |
| 2005/0033881 A1 | 2/2005 | Yao | |
| 2005/0132238 A1 | 6/2005 | Nanja | |
| 2006/0050670 A1 | 3/2006 | Hillyard et al. | |
| 2006/0053326 A1 | 3/2006 | Naveh | |
| 2006/0059286 A1 | 3/2006 | Bertone et al. | |
| 2006/0069936 A1 | 3/2006 | Lint et al. | |
| 2006/0117202 A1 | 6/2006 | Magklis et al. | |
| 2006/0184287 A1 | 8/2006 | Belady et al. | |
| 2007/0005995 A1 | 1/2007 | Kardach et al. | |
| 2007/0016817 A1 | 1/2007 | Albonesi et al. | |
| 2007/0079294 A1 | 4/2007 | Knight | |
| 2007/0106827 A1 | 5/2007 | Boatright et al. | |
| 2007/0110360 A1 * | 5/2007 | Stanford | H04L 12/10 |
| | | | 385/14 |
| 2007/0156992 A1 | 7/2007 | Jahagirdar | |
| 2007/0214342 A1 | 9/2007 | Newburn | |
| 2007/0239398 A1 | 10/2007 | Song et al. | |
| 2007/0245163 A1 | 10/2007 | Lu et al. | |
| 2008/0028240 A1 | 1/2008 | Arai et al. | |
| 2008/0178019 A1 | 7/2008 | McGrane et al. | |
| 2008/0250260 A1 | 10/2008 | Tomita | |
| 2008/0263373 A1 * | 10/2008 | Meier | G06F 9/3017 |
| | | | 713/300 |
| 2009/0006871 A1 | 1/2009 | Liu et al. | |
| 2009/0150695 A1 | 6/2009 | Song et al. | |
| 2009/0150696 A1 | 6/2009 | Song et al. | |
| 2009/0158061 A1 | 6/2009 | Schmitz et al. | |
| 2009/0158067 A1 | 6/2009 | Bodas et al. | |
| 2009/0172375 A1 | 7/2009 | Rotem et al. | |
| 2009/0172428 A1 | 7/2009 | Lee | |
| 2009/0235105 A1 | 9/2009 | Branover et al. | |
| 2010/0115309 A1 | 5/2010 | Carvalho et al. | |
| 2010/0146513 A1 | 6/2010 | Song | |
| 2010/0191997 A1 | 7/2010 | Dodeja et al. | |
| 2011/0154090 A1 | 6/2011 | Dixon et al. | |
| 2012/0079290 A1 | 3/2012 | Kumar | |
| 2012/0246506 A1 | 9/2012 | Knight | |
| 2012/0254633 A1 | 10/2012 | Vilhauer et al. | |
| 2013/0061064 A1 | 3/2013 | Ananthakrishnan et al. | |
| 2013/0080803 A1 | 3/2013 | Ananthakrishnan et al. | |
| 2013/0080804 A1 | 3/2013 | Ananthakrishnan et al. | |
| 2013/0111120 A1 | 5/2013 | Ananthakrishnan et al. | |
| 2013/0111121 A1 | 5/2013 | Ananthakrishnan et al. | |
| 2013/0111226 A1 | 5/2013 | Ananthakrishnan et al. | |
| 2013/0111236 A1 | 5/2013 | Ananthakrishnan et al. | |
| 2013/0254579 A1 * | 9/2013 | Derbyshire | G06F 1/3212 |
| | | | 713/340 |
| 2013/0297089 A1 | 11/2013 | Fu et al. | |
| 2013/0346774 A1 | 12/2013 | Bhandaru et al. | |
| 2014/0068290 A1 | 3/2014 | Bhandaru et al. | |
| 2014/0089699 A1 * | 3/2014 | O'Connor | G06F 1/324 |
| | | | 713/322 |
| 2014/0149760 A1 * | 5/2014 | Drake | G06F 1/3234 |
| | | | 713/320 |
| 2014/0195829 A1 | 7/2014 | Bhandaru et al. | |
| 2014/0208141 A1 | 7/2014 | Bhandaru et al. | |
| 2014/0359310 A1 | 12/2014 | Haridass et al. | |
| 2015/0006925 A1 * | 1/2015 | Branover | G06F 1/3206 |
| | | | 713/320 |
| 2016/0070327 A1 * | 3/2016 | Nemani | G06F 1/324 |
| | | | 713/300 |

OTHER PUBLICATIONS

Intel Developer Forum, IDF2010, Opher Kahn, et al., "Intel Next Generation Microarchitecture Codename Sandy Bridge: New Processor Innovations," Sep. 13, 2010, 58 pages.

SPEC—Power and Performance, Design Overview V1.10, Standard Performance Information Corp., Oct. 21, 2008, 6 pages.

Intel Technology Journal, "Power and Thermal Management in the Intel Core Duo Processor," May 15, 2006, pp. 109-122.

Anoop Iyer, et al., "Power and Performance Evaluation of Globally Asynchronous Locally Synchronous Processors,"2002, pp. 1-11.

Greg Semeraro, et al., "Hiding Synchronization Delays In A GALS Processor Microarchitecture," 2004, pp. 1-13.

Joan-Manuel Parcerisa, et al., "Efficient Interconnects for Clustered Microarchitectures," 2002, pp. 1-10.

Grigorios Magklis, et al., "Profile-Based Dynamic Voltage and Frequency Scalling for a Multiple Clock Domain Microprocessor," 2003, pp. 1-12.

Greg Semeraro, et al., "Dynamic Frequency and Voltage Control for a Multiple Clock Domain Architecture," 2002, pp. 1-12.

Greg Semeraro, "Energy-Efficient Processor Design Using Multiple Clock Domains with Dynamic Voltage and Frequency Scaling," 2002, pp. 29-40.

Diana Marculescu, "Application Adaptive Energy Efficient Clustered Architectures," 2004, pp. 344-349.

L. Benin!, et al., "System-Level Dynamic Power Management," 1999, pp. 23-31.

Ravindra Jejurikar, et al., "Leakage Aware Dynamic Voltage Scaling for Real-Time Embedded Systems," 2004, pp. 275-280.

Ravindra Jejurikar, et al., "Dynamic Slack Reclamation With Procrastination Scheduling in Real-Time Embedded Systems," 2005, pp. 13-17.

R. Todling, et al., "Some Strategies for Kalman Filtering and Smoothing," 1996, pp. 1-21.

R.E. Kalman, "A New Approach to Linear Filtering and Prediction Problems," 1960, pp. 1-12.

Intel Corporation, "Intel 64 and IA-32 Architectures Software Developer's Manual," vol. 3 (3A, 3B & 3C): System Programming Guide, Feb. 2014, Chapter 14 Power and Thermal Management (14.1 - 14.9.5), 44 pages.

Taiwan office action issued in corresponding Taiwan application No. 105100964 dated Mar. 8, 2017.

* cited by examiner

US 9,874,922 B2

PERFORMING DYNAMIC POWER CONTROL OF PLATFORM DEVICES

TECHNICAL FIELD

Embodiments relate to power management of a system, and more particularly to power management of a multicore processor.

BACKGROUND

Advances in semiconductor processing and logic design have permitted an increase in the amount of logic that may be present on integrated circuit devices. As a result, computer system configurations have evolved from a single or multiple integrated circuits in a system to multiple hardware threads, multiple cores, multiple devices, and/or complete systems on individual integrated circuits. Additionally, as the density of integrated circuits has grown, the power requirements for computing systems (from embedded systems to servers) have also escalated. Furthermore, software inefficiencies, and its requirements of hardware, have also caused an increase in computing device energy consumption. In fact, some studies indicate that computing devices consume a sizeable percentage of the entire electricity supply for a country, such as the United States of America. As a result, there is a vital need for energy efficiency and conservation associated with integrated circuits. These needs will increase as servers, desktop computers, notebooks, Ultrabooks™, tablets, mobile phones, processors, embedded systems, etc. become even more prevalent (from inclusion in the typical computer, automobiles, and televisions to biotechnology).

DETAILED DESCRIPTION

Figure 1:
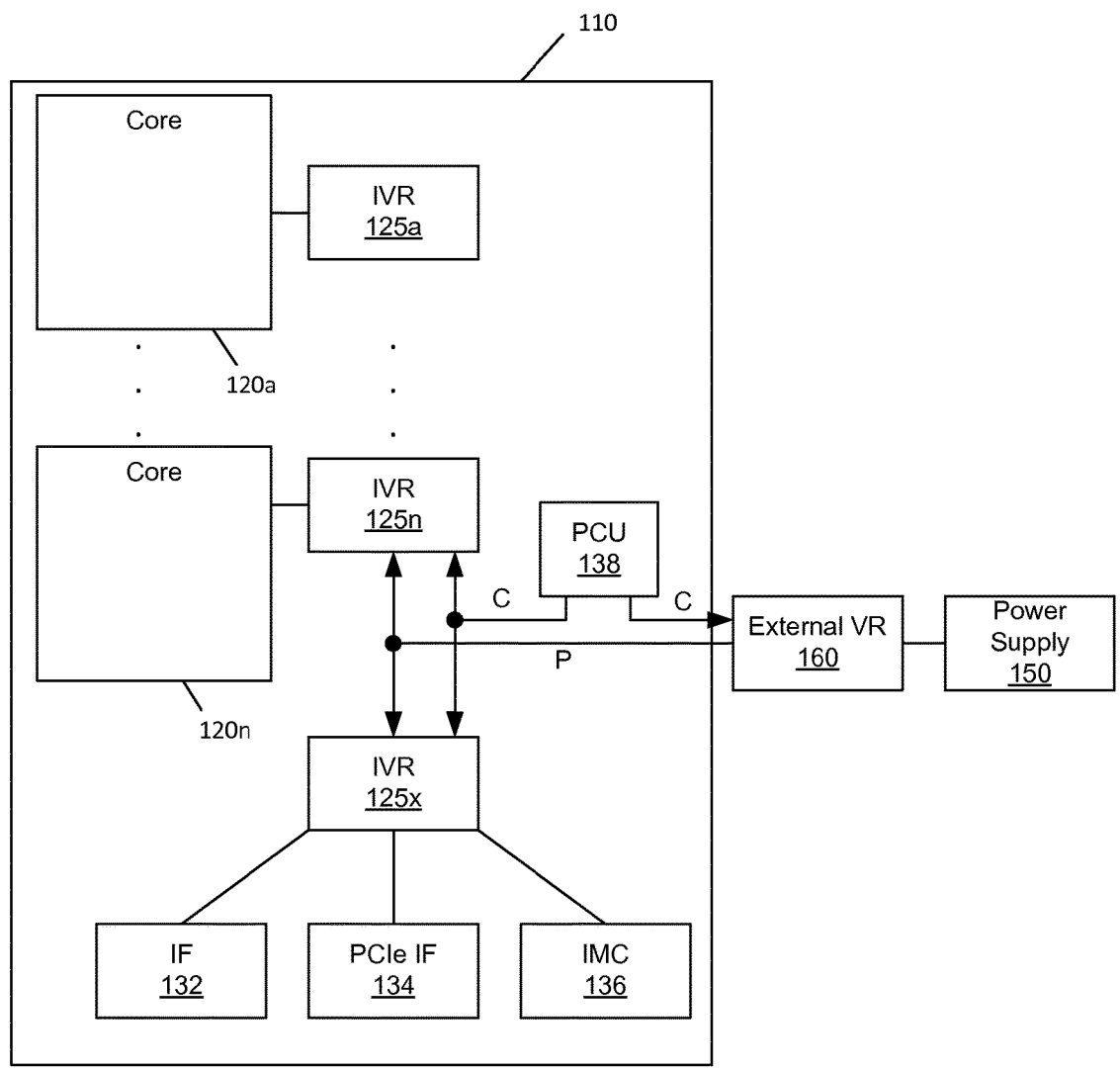
FIG. 1 is a block diagram of a portion of a system in accordance with an embodiment of the present invention.

Many platforms such as portable, connected, battery-operated devices (examples include cellular phones such as smartphones, tablets, laptops, fitness trackers, global positioning system (GPS) units, and wearable devices or other Internet of Things (IoT) devices) have components that consume bursts of higher activity. Examples of such components include wireless communications components (e.g., 3G/4G/LTE modems, local and wide area wireless network devices, near field communication devices, other radios), GPS sensors and cameras, among others.

A system or platform is designed to have a maximum power specification, with a power delivery system designed to provide such power. However, designing a platform power delivery system to deliver a maximum power based on the sum of worst-case power consumption of all platform components is costly in terms of price, size (spatial volume), weight and complexity. Instead designing a power delivery system for the sum of the worst-case power consumption levels of the components, derated by a certain static amount, can lead to situations in which the derating is not valid at all times (and thus a platform cannot operate as desired).

Embodiments may provide a platform design having a reduced size, cost, etc., as a power control entity may be configured to dynamically enable one or more devices of the platform to enter (and exit) a higher power consumption mode, referred to herein as a device turbo mode, to enable a dynamic execution of a use case for the device using higher power consumption.

Although the following embodiments are described with reference to energy conservation and energy efficiency in specific integrated circuits, such as in computing platforms or processors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to any particular type of computer systems. That is, disclosed embodiments can be used in many different system types, ranging from server computers (e.g., tower, rack, blade, micro-server and so forth), communications systems, storage systems, desktop computers of any configuration, laptop, notebook, and tablet computers (including 2:1 tablets, phablets and so forth), and may be also used in other devices, such as handheld devices, systems on chip (SoCs), and embedded applications. Some examples of handheld devices include cellular phones such as smartphones, Internet protocol devices, digital cameras, personal digital assistants (PDAs), and handheld PCs. Embedded applications may typically include a microcontroller, a digital signal processor (DSP), network computers (NetPC), set-top boxes, network hubs, wide area network (WAN) switches, wearable devices, or any other system that can perform the functions and operations taught below. More so, embodiments may be implemented in mobile terminals having standard voice functionality such as mobile phones, smartphones and phablets, and/or in non-mobile terminals without a standard wireless voice function communication capability, such as many wearables, tablets, notebooks, desktops, micro-servers, servers and so forth. Moreover, the apparatuses, methods, and systems described herein are not limited to physical computing devices, but may also relate to software optimizations for energy conservation and efficiency. As will become readily apparent in the description below, the embodiments of methods, apparatuses, and systems described herein (whether in reference to hardware, firmware, software, or a combination thereof) are vital to a 'green technology' future, such as for power conservation and energy efficiency in products that encompass a large portion of the US economy.

Referring now to FIG. 1, shown is a block diagram of a portion of a system in accordance with an embodiment of the present invention. As shown in FIG. 1, system 100 may include various components, including a processor 110 which as shown is a multicore processor. Processor 110 may be coupled to a power supply 150 via an external voltage regulator 160, which may perform a first voltage conversion to provide a primary regulated voltage to processor 110.

As seen, processor 110 may be a single die processor including multiple cores $120_a$-$120_n$. In addition, each core may be associated with an integrated voltage regulator (IVR) $125_a$-$125_n$ which receives the primary regulated voltage and generates an operating voltage to be provided to one or more agents of the processor associated with the IVR. Accordingly, an IVR implementation may be provided to allow for fine-grained control of voltage and thus power and performance of each individual core. As such, each core can operate at an independent voltage and frequency, enabling great flexibility and affording wide opportunities for balancing power consumption with performance. In some embodiments, the use of multiple IVRs enables the grouping of components into separate power planes, such that power is regulated and supplied by the IVR to only those components in the group. During power management, a given power plane of one IVR may be powered down or off when the processor is placed into a certain low power state, while another power plane of another IVR remains active, or fully powered.

Still referring to FIG. 1, additional components may be present within the processor including an input/output interface 132, another interface 134, and an integrated memory controller 136. As seen, each of these components may be powered by another integrated voltage regulator $125_x$. In one embodiment, interface 132 may be enable operation for an Intel® Quick Path Interconnect (QPI) interconnect, which provides for point-to-point (PtP) links in a cache coherent protocol that includes multiple layers including a physical layer, a link layer and a protocol layer. In turn, interface 134 may communicate via a Peripheral Component Interconnect Express (PCIe™) protocol.

Also shown is a power control unit (PCU) 138, which may include hardware, software and/or firmware to perform power management operations with regard to processor 110. As seen, PCU 138 provides control information to external voltage regulator 160 via a digital interface to cause the voltage regulator to generate the appropriate regulated voltage. PCU 138 also provides control information to IVRs 125 via another digital interface to control the operating voltage generated (or to cause a corresponding IVR to be disabled in a low power mode). In various embodiments, PCU 138 may include a variety of power management logic units to perform hardware-based power management. Such power management may be wholly processor controlled (e.g., by various processor hardware, and which may be triggered by workload and/or power, thermal or other processor constraints) and/or the power management may be performed responsive to external sources (such as a platform or management power management source or system software).

Further as described herein, PCU 138 may include additional power control logic to aid in power management activities for devices coupled to processor 100, such as one or more components of a mobile system, to enable a given device to enter into an increased performance state for a limited duration of time to enable that device to perform a particular operation or function, and then to return to a lower performance (and power) state. In addition, such power control logic may coordinate power management between multiple devices of the system to enable the device to enter into an increased power (and performance) state to perform the particular use case, while at the same time causing one or more other devices to enter into a lower power (and performance) state to enable that use case, as described further herein.

While not shown for ease of illustration, understand that additional components may be present within processor 110 such as uncore logic, and other components such as internal memories, e.g., one or more levels of a cache memory hierarchy and so forth. Furthermore, while shown in the implementation of FIG. 1 with an integrated voltage regulator, embodiments are not so limited.

Note that the power management techniques described herein may be independent of and complementary to an operating system (OS)-based power management (OSPM) mechanism. According to one example OSPM technique, a processor can operate at various performance states or levels, so-called P-states, namely from P0 to PN. In general, the P1 performance state may correspond to the highest guaranteed performance state that can be requested by an OS. In addition to this P1 state, the OS can further request a higher performance state, namely a P0 state. This P0 state may thus be an opportunistic or turbo mode state in which, when power and/or thermal budget is available, processor hardware can configure the processor or at least portions thereof to operate at a higher than guaranteed frequency. In many implementations a processor can include multiple so-called bin frequencies above the P1 guaranteed maximum frequency, exceeding to a maximum peak frequency of the particular processor, as fused or otherwise written into the processor during manufacture. In addition, according to one OSPM mechanism, a processor can operate at various power states or levels. With regard to power states, an OSPM mechanism may specify different power consumption states, generally referred to as C-states, C0, C1 to Cn states. When a core is active, it runs at a C0 state, and when the core is idle it may be placed in a core low power state, also called a core non-zero C-state (e.g., C1-C6 states), with each C-state being at a lower power consumption level (such that C6 is a deeper low power state than C1, and so forth).

Understand that many different types of power management techniques may be used individually or in combination in different embodiments. As representative examples, a power controller may control the processor to be power managed by some form of dynamic voltage frequency scaling (DVFS) in which an operating voltage and/or operating frequency of one or more cores or other processor logic may be dynamically controlled to reduce power consumption in certain situations. In an example, DVFS may be performed using Enhanced Intel SpeedStep™ technology available from Intel Corporation, Santa Clara, Calif., to provide optimal performance at a lowest power consumption level. In another example, DVFS may be performed using Intel TurboBoost™ technology to enable one or more cores or other compute engines to operate at a higher than guaranteed operating frequency based on conditions (e.g., workload and availability).

Another power management technique that may be used in certain examples is dynamic swapping of workloads between different compute engines. For example, the processor may include asymmetric cores or other processing engines that operate at different power consumption levels, such that in a power constrained situation, one or more workloads can be dynamically switched to execute on a lower power core or other compute engine. Another exemplary power management technique is hardware duty cycling (HDC), which may cause cores and/or other compute engines to be periodically enabled and disabled according to a duty cycle, such that one or more cores may be made inactive during an inactive period of the duty cycle and made active during an active period of the duty cycle. Although described with these particular examples, understand that many other power management techniques may be used in particular embodiments.

Figure 2:
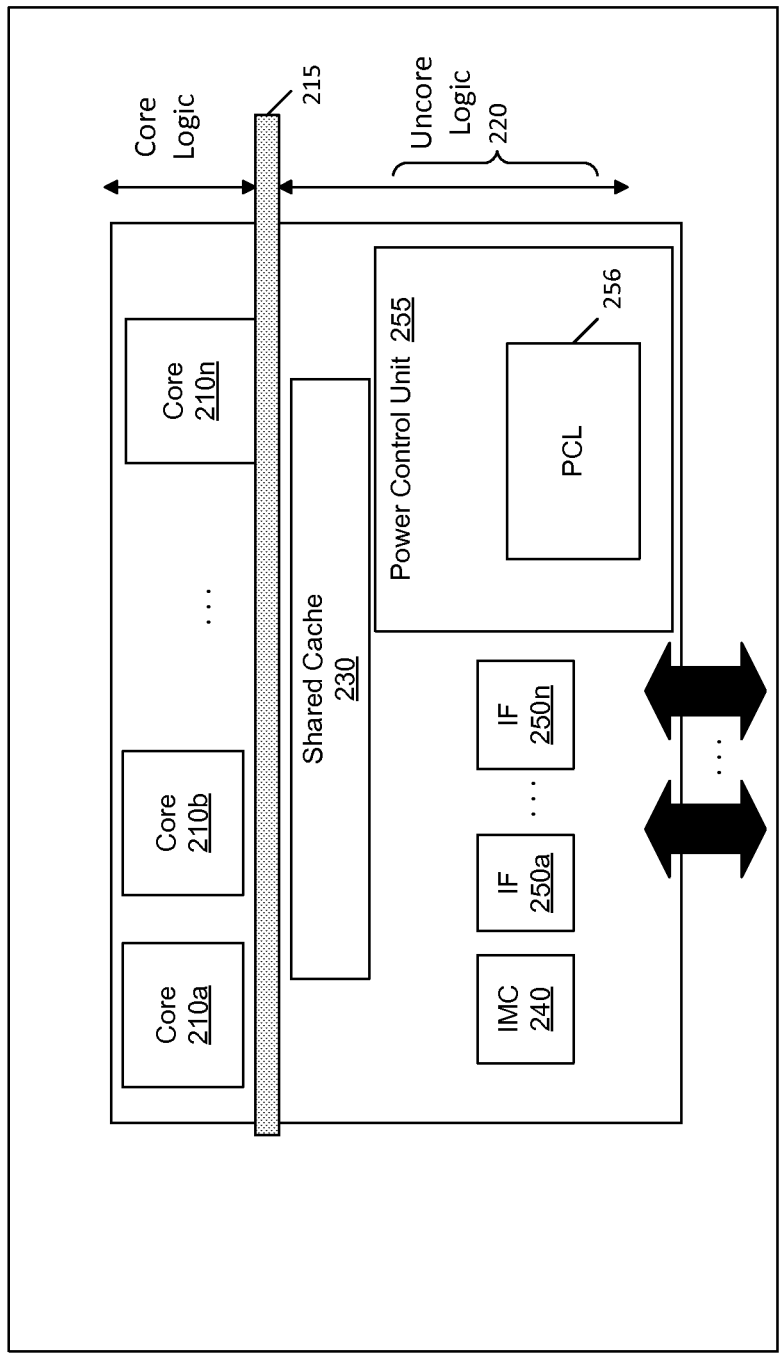
FIG. 2 is a block diagram of a processor in accordance with an embodiment of the present invention.

Embodiments can be implemented in processors for various markets including server processors, desktop processors, mobile processors and so forth. Referring now to FIG. 2, shown is a block diagram of a processor in accordance with an embodiment of the present invention. As shown in FIG. 2, processor 200 may be a multicore processor including a plurality of cores $210_a$-$210_n$. In one embodiment, each such core may be of an independent power domain and can be configured to enter and exit active states and/or maximum performance states based on workload. The various cores may be coupled via an interconnect 215 to a system agent or uncore 220 that includes various components. As seen, the uncore 220 may include a shared cache 230 which may be a last level cache. In addition, the uncore may include an integrated memory controller 240 to communicate with a system memory (not shown in FIG. 2), e.g., via a memory bus. Uncore 220 also includes various interfaces 250 and a power control unit 255, which may include logic to perform the power management techniques described herein. In the embodiment shown, power control unit 255 includes a power control logic 256 which may be configured to perform power management operations for coupled devices to enable one or more such devices to opportunistically enter into a device turbo mode to perform a particular operation or function of a desired use case.

In addition, by interfaces 250a-250n, connection can be made to various off-chip components such as peripheral devices, mass storage and so forth. While shown with this particular implementation in the embodiment of FIG. 2, the scope of the present invention is not limited in this regard.

Figure 3:
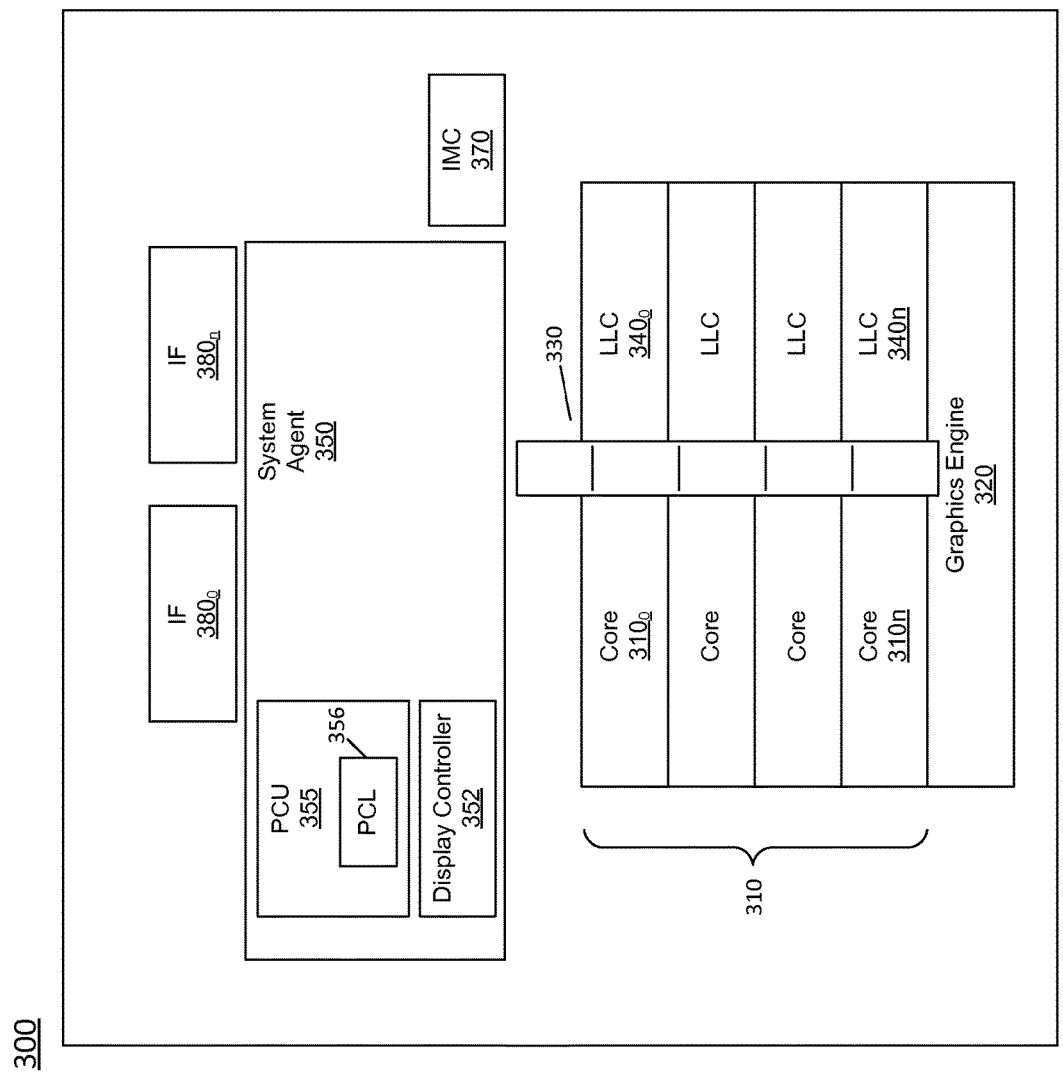
FIG. 3 is a block diagram of a multi-domain processor in accordance with another embodiment of the present invention.

Referring now to FIG. 3, shown is a block diagram of a multi-domain processor in accordance with another embodiment of the present invention. As shown in the embodiment of FIG. 3, processor 300 includes multiple domains. Specifically, a core domain 310 can include a plurality of cores $310_0$-$310_n$, a graphics domain 320 can include one or more graphics engines, and a system agent domain 350 may further be present. In some embodiments, system agent domain 350 may execute at an independent frequency than the core domain and may remain powered on at all times to handle power control events and power management such that domains 310 and 320 can be controlled to dynamically enter into and exit high power and low power states. Each of domains 310 and 320 may operate at different voltage and/or power. Note that while only shown with three domains, understand the scope of the present invention is not limited in this regard and additional domains can be present in other embodiments. For example, multiple core domains may be present each including at least one core.

In general, each core 310 may further include low level caches in addition to various execution units and additional processing elements. In turn, the various cores may be coupled to each other and to a shared cache memory formed of a plurality of units of a last level cache (LLC) $340_0$-$340_n$. In various embodiments, LLC 340 may be shared amongst the cores and the graphics engine, as well as various media processing circuitry. As seen, a ring interconnect 330 thus couples the cores together, and provides interconnection between the cores, graphics domain 320 and system agent circuitry 350. In one embodiment, interconnect 330 can be part of the core domain. However in other embodiments the ring interconnect can be of its own domain.

As further seen, system agent domain 350 may include display controller 352 which may provide control of and an interface to an associated display. As further seen, system agent domain 350 may include a power control unit 355 which can include logic to perform the power management techniques described herein. In the embodiment shown, power control unit 355 includes a power control logic 356 which may be configured to perform power management operations for coupled devices to enable one or more such devices to opportunistically enter into a device turbo mode to perform a particular operation or function of a desired use case.

As further seen in FIG. 3, processor 300 can further include an integrated memory controller (IMC) 370 that can provide for an interface to a system memory, such as a dynamic random access memory (DRAM). Multiple interfaces $380_0$-$380_n$ may be present to enable interconnection between the processor and other circuitry. For example, in one embodiment at least one direct media interface (DMI) interface may be provided as well as one or more PCIe™ interfaces. Still further, to provide for communications between other agents such as additional processors or other circuitry, one or more QPI interfaces may also be provided. Although shown at this high level in the embodiment of FIG. 3, understand the scope of the present invention is not limited in this regard.

Figure 4:
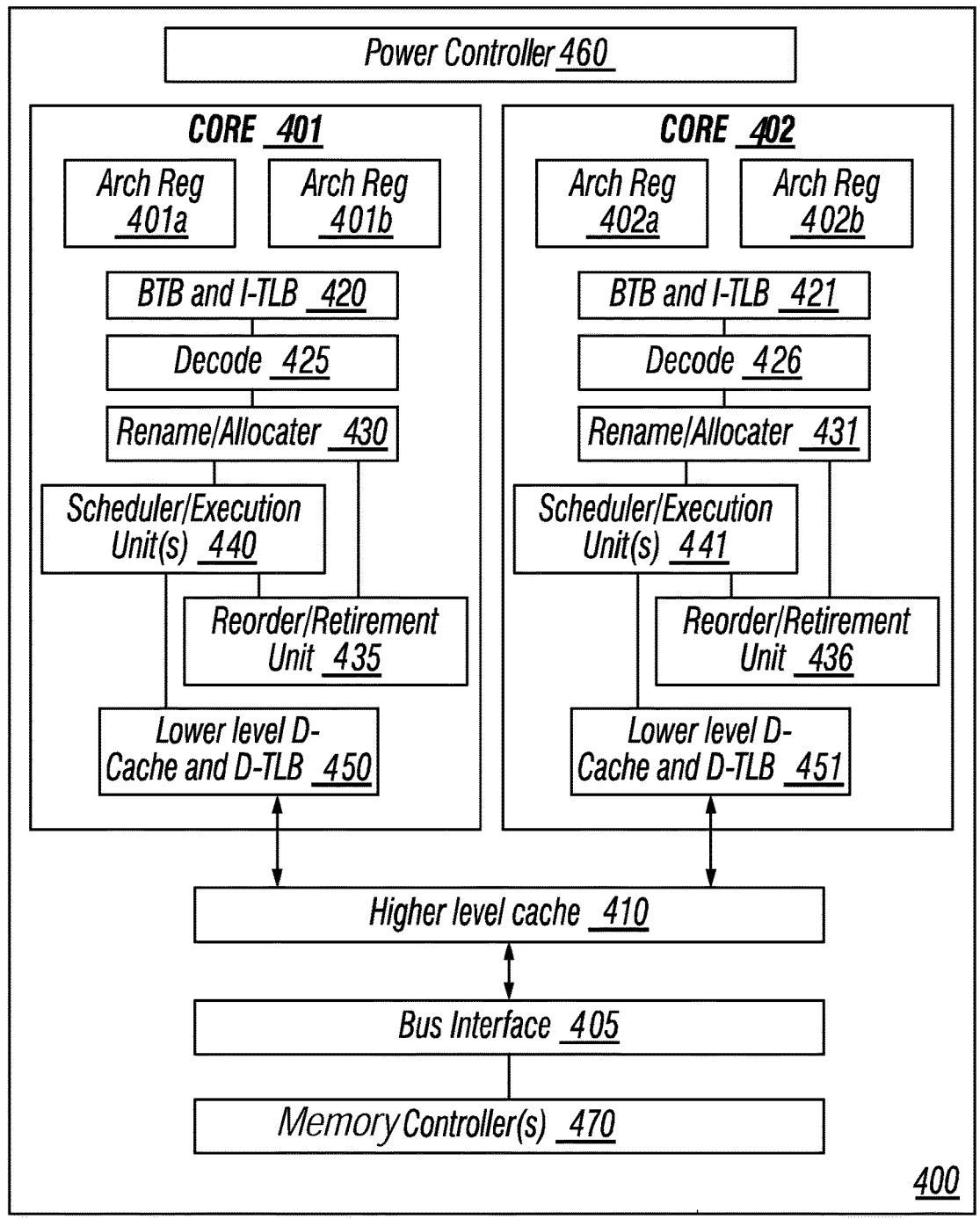
FIG. 4 is an embodiment of a processor including multiple cores.

Referring to FIG. 4, an embodiment of a processor including multiple cores is illustrated. Processor 400 includes any processor or processing device, such as a microprocessor, an embedded processor, a digital signal processor (DSP), a network processor, a handheld processor, an application processor, a co-processor, a system on a chip (SoC), or other device to execute code. Processor 400, in one embodiment, includes at least two cores—cores 401 and 402, which may include asymmetric cores or symmetric cores (the illustrated embodiment). However, processor 400 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 400, as illustrated in FIG. 4, includes two cores, cores 401 and 402. Here, cores 401 and 402 are considered symmetric cores, i.e., cores with the same configurations, functional units, and/or logic. In another embodiment, core 401 includes an out-of-order processor core, while core 402 includes an in-order processor core. However, cores 401 and 402 may be individually selected from any type of core, such as a native core, a software managed core, a core adapted to execute a native instruction set architecture (ISA), a core adapted to execute a translated ISA, a co-designed core, or other known core. Yet to further the discussion, the functional units illustrated in core 401 are described in further detail below, as the units in core 402 operate in a similar manner.

As depicted, core 401 includes two hardware threads 401a and 401b, which may also be referred to as hardware thread slots 401a and 401b. Therefore, software entities, such as an operating system, in one embodiment potentially view processor 400 as four separate processors, i.e., four logical processors or processing elements capable of executing four software threads concurrently. As alluded to above, a first thread is associated with architecture state registers 401a, a second thread is associated with architecture state registers 401b, a third thread may be associated with architecture state registers 402a, and a fourth thread may be associated with architecture state registers 402b. Here, each of the architecture state registers (401a, 401b, 402a, and 402b) may be referred to as processing elements, thread slots, or thread units, as described above. As illustrated, architecture state registers 401a are replicated in architecture state registers 401b, so individual architecture states/contexts are capable of being stored for logical processor 401a and logical processor 401b. In core 401, other smaller resources, such as instruction pointers and renaming logic in allocator and renamer block 430 may also be replicated for threads 401a and 401b. Some resources, such as re-order buffers in reorder/retirement unit 435, ILTB 420, load/store buffers, and queues may be shared through partitioning. Other resources, such as general purpose internal registers, page-table base register(s), low-level data-cache and data-TLB 415, execution unit(s) 440, and portions of out-of-order unit 435 are potentially fully shared.

Processor 400 often includes other resources, which may be fully shared, shared through partitioning, or dedicated by/to processing elements. In FIG. 4, an embodiment of a purely exemplary processor with illustrative logical units/resources of a processor is illustrated. Note that a processor may include, or omit, any of these functional units, as well as include any other known functional units, logic, or firmware not depicted. As illustrated, core 401 includes a simplified, representative out-of-order (OOO) processor core. But an in-order processor may be utilized in different embodiments. The OOO core includes a branch target buffer 420 to predict branches to be executed/taken and an instruction-translation buffer (I-TLB) 420 to store address translation entries for instructions.

Core 401 further includes decode module 425 coupled to fetch unit 420 to decode fetched elements. Fetch logic, in one embodiment, includes individual sequencers associated with thread slots 401a, 401b, respectively. Usually core 401 is associated with a first ISA, which defines/specifies instructions executable on processor 400. Often machine code instructions that are part of the first ISA include a portion of the instruction (referred to as an opcode), which references/specifies an instruction or operation to be performed. Decode logic 425 includes circuitry that recognizes these instructions from their opcodes and passes the decoded instructions on in the pipeline for processing as defined by the first ISA. For example, decoders 425, in one embodiment, include logic designed or adapted to recognize specific instructions, such as transactional instruction. As a result of the recognition by decoders 425, the architecture or core 401 takes specific, predefined actions to perform tasks associated with the appropriate instruction. It is important to note that any of the tasks, blocks, operations, and methods described herein may be performed in response to a single or multiple instructions; some of which may be new or old instructions.

In one example, allocator and renamer block 430 includes an allocator to reserve resources, such as register files to store instruction processing results. However, threads 401a and 401b are potentially capable of out-of-order execution, where allocator and renamer block 430 also reserves other resources, such as reorder buffers to track instruction results. Unit 430 may also include a register renamer to rename program/instruction reference registers to other registers internal to processor 400. Reorder/retirement unit 435 includes components, such as the reorder buffers mentioned above, load buffers, and store buffers, to support out-of-order execution and later in-order retirement of instructions executed out-of-order.

Scheduler and execution unit(s) block 440, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 450 are coupled to execution unit(s) 440. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 401 and 402 share access to higher-level or further-out cache 410, which is to cache recently fetched elements. Note that higher-level or further-out refers to cache levels increasing or getting further away from the execution unit(s). In one embodiment, higher-level cache 410 is a last-level data cache—last cache in the memory hierarchy on processor 400—such as a second or third level data cache. However, higher level cache 410 is not so limited, as it may be associated with or includes an instruction cache. A trace cache—a type of instruction cache—instead may be coupled after decoder 425 to store recently decoded traces.

In the depicted configuration, processor 400 also includes bus interface module 405 and a power controller 460, which may perform power management in accordance with an embodiment of the present invention. In this scenario, bus interface 405 is to communicate with devices external to processor 400, such as system memory and other components.

A memory controller 470 may interface with other devices such as one or many memories. In an example, bus interface 405 includes a ring interconnect with a memory controller for interfacing with a memory and a graphics controller for interfacing with a graphics processor. In an SoC environment, even more devices, such as a network interface, coprocessors, memory, graphics processor, and any other known computer devices/interface may be integrated on a single die or integrated circuit to provide small form factor with high functionality and low power consumption.

Figure 5:
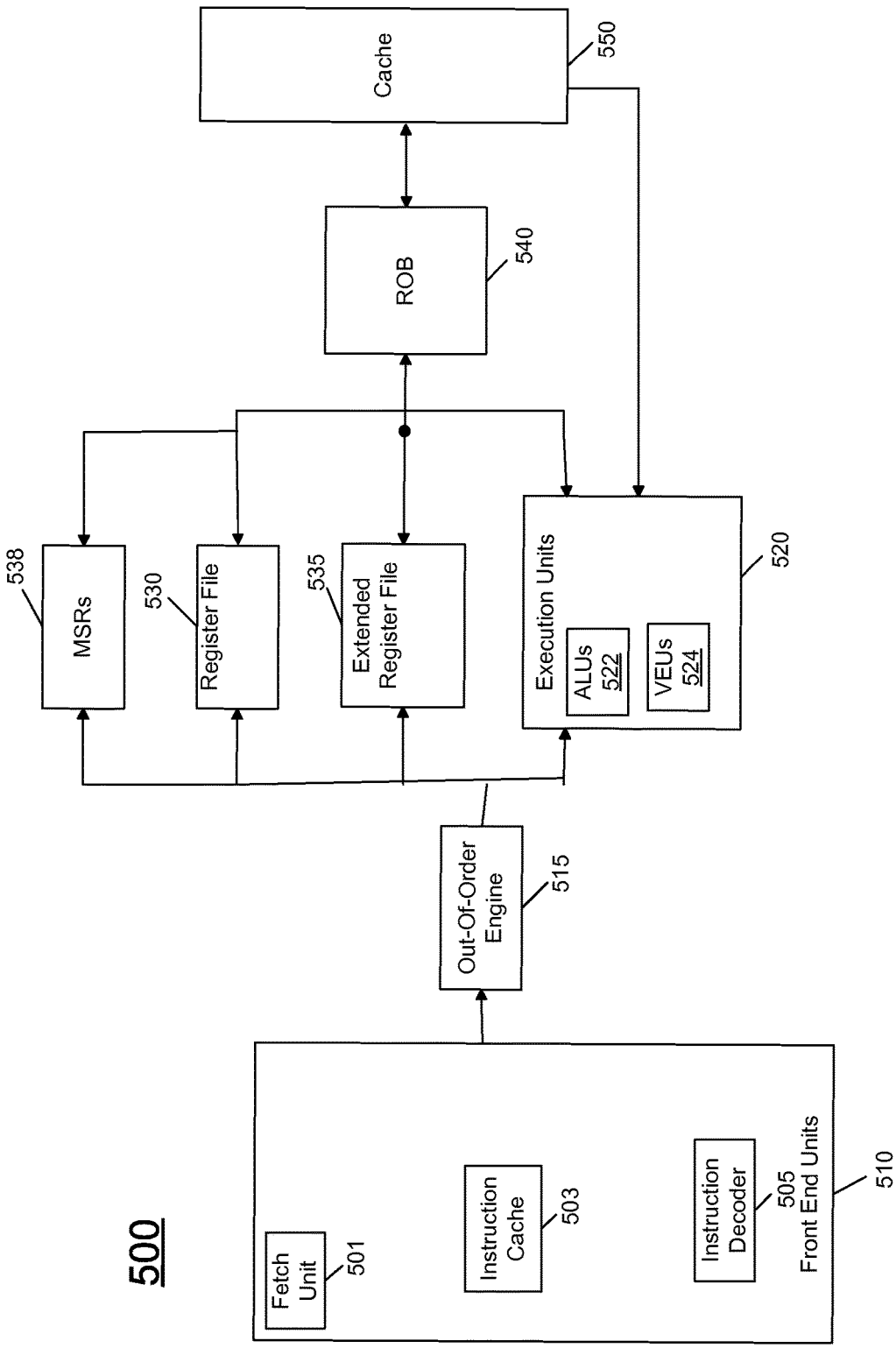
FIG. 5 is a block diagram of a micro-architecture of a processor core in accordance with one embodiment of the present invention.

Referring now to FIG. 5, shown is a block diagram of a micro-architecture of a processor core in accordance with one embodiment of the present invention. As shown in FIG. 5, processor core 500 may be a multi-stage pipelined out-of-order processor. Core 500 may operate at various voltages based on a received operating voltage, which may be received from an integrated voltage regulator or external voltage regulator.

As seen in FIG. 5, core 500 includes front end units 510, which may be used to fetch instructions to be executed and prepare them for use later in the processor pipeline. For example, front end units 510 may include a fetch unit 501, an instruction cache 503, and an instruction decoder 505. In some implementations, front end units 510 may further include a trace cache, along with microcode storage as well as a micro-operation storage. Fetch unit 501 may fetch macro-instructions, e.g., from memory or instruction cache 503, and feed them to instruction decoder 505 to decode them into primitives, i.e., micro-operations for execution by the processor.

Coupled between front end units 510 and execution units 520 is an out-of-order (OOO) engine 515 that may be used to receive the micro-instructions and prepare them for execution. More specifically OOO engine 515 may include various buffers to re-order micro-instruction flow and allocate various resources needed for execution, as well as to provide renaming of logical registers onto storage locations within various register files such as register file 530 and extended register file 535. Register file 530 may include separate register files for integer and floating point operations. For purposes of configuration, control, and additional operations, a set of machine specific registers (MSRs) 538 may also be present and accessible to various logic within core 500 (and external to the core). For example, power limit information may be stored in one or more MSR and be dynamically updated as described herein.

Various resources may be present in execution units 520, including, for example, various integer, floating point, and single instruction multiple data (SIMD) logic units, among other specialized hardware. For example, such execution units may include one or more arithmetic logic units (ALUs) 522 and one or more vector execution units 524, among other such execution units.

Results from the execution units may be provided to retirement logic, namely a reorder buffer (ROB) 540. More specifically, ROB 540 may include various arrays and logic to receive information associated with instructions that are executed. This information is then examined by ROB 540 to determine whether the instructions can be validly retired and result data committed to the architectural state of the processor, or whether one or more exceptions occurred that prevent a proper retirement of the instructions. Of course, ROB 540 may handle other operations associated with retirement.

As shown in FIG. 5, ROB 540 is coupled to a cache 550 which, in one embodiment may be a low level cache (e.g., an L1 cache) although the scope of the present invention is not limited in this regard. Also, execution units 520 can be directly coupled to cache 550. From cache 550, data communication may occur with higher level caches, system memory and so forth. While shown with this high level in the embodiment of FIG. 5, understand the scope of the present invention is not limited in this regard. For example, while the implementation of FIG. 5 is with regard to an out-of-order machine such as of an Intel® x86 instruction set architecture (ISA), the scope of the present invention is not limited in this regard. That is, other embodiments may be implemented in an in-order processor, a reduced instruction set computing (RISC) processor such as an ARM-based processor, or a processor of another type of ISA that can emulate instructions and operations of a different ISA via an emulation engine and associated logic circuitry.

Figure 6:
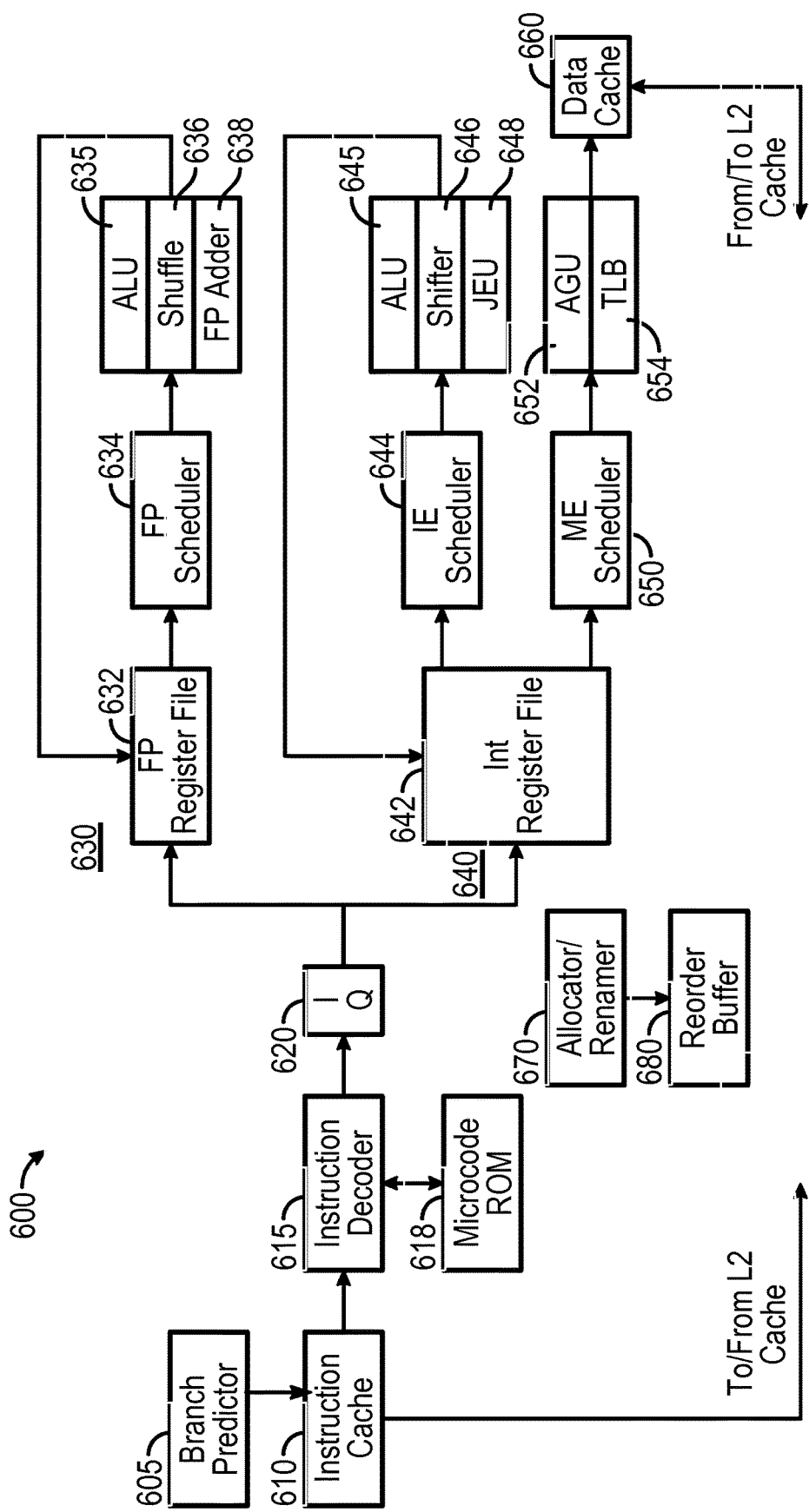
FIG. 6 is a block diagram of a micro-architecture of a processor core in accordance with another embodiment.

Referring now to FIG. 6, shown is a block diagram of a micro-architecture of a processor core in accordance with another embodiment. In the embodiment of FIG. 6, core 600 may be a low power core of a different micro-architecture, such as an Intel® Atom™-based processor having a relatively limited pipeline depth designed to reduce power consumption. As seen, core 600 includes an instruction cache 610 coupled to provide instructions to an instruction decoder 615. A branch predictor 605 may be coupled to instruction cache 610. Note that instruction cache 610 may further be coupled to another level of a cache memory, such as an L2 cache (not shown for ease of illustration in FIG. 6). In turn, instruction decoder 615 provides decoded instructions to an issue queue 620 for storage and delivery to a given execution pipeline. A microcode ROM 618 is coupled to instruction decoder 615.

A floating point pipeline 630 includes a floating point register file 632 which may include a plurality of architectural registers of a given bit with such as 128, 256 or 512 bits. Pipeline 630 includes a floating point scheduler 634 to schedule instructions for execution on one of multiple execution units of the pipeline. In the embodiment shown, such execution units include an ALU 635, a shuffle unit 636, and a floating point adder 638. In turn, results generated in these execution units may be provided back to buffers and/or registers of register file 632. Of course understand while shown with these few example execution units, additional or different floating point execution units may be present in another embodiment.

An integer pipeline 640 also may be provided. In the embodiment shown, pipeline 640 includes an integer register file 642 which may include a plurality of architectural registers of a given bit with such as 128 or 256 bits. Pipeline 640 includes an integer scheduler 644 to schedule instructions for execution on one of multiple execution units of the pipeline. In the embodiment shown, such execution units include an ALU 645, a shifter unit 646, and a jump execution unit 648. In turn, results generated in these execution units may be provided back to buffers and/or registers of register file 642. Of course understand while shown with these few example execution units, additional or different integer execution units may be present in another embodiment.

A memory execution scheduler 650 may schedule memory operations for execution in an address generation unit 652, which is also coupled to a TLB 654. As seen, these structures may couple to a data cache 660, which may be a L0 and/or L1 data cache that in turn couples to additional levels of a cache memory hierarchy, including an L2 cache memory.

To provide support for out-of-order execution, an allocator/renamer 670 may be provided, in addition to a reorder buffer 680, which is configured to reorder instructions executed out of order for retirement in order. Although shown with this particular pipeline architecture in the illustration of FIG. 6, understand that many variations and alternatives are possible.

Note that in a processor having asymmetric cores, such as in accordance with the micro-architectures of FIGS. 5 and 6, workloads may be dynamically swapped between the cores for power management reasons, as these cores, although having different pipeline designs and depths, may be of the same or related ISA. Such dynamic core swapping may be performed in a manner transparent to a user application (and possibly kernel also).

Figure 7:
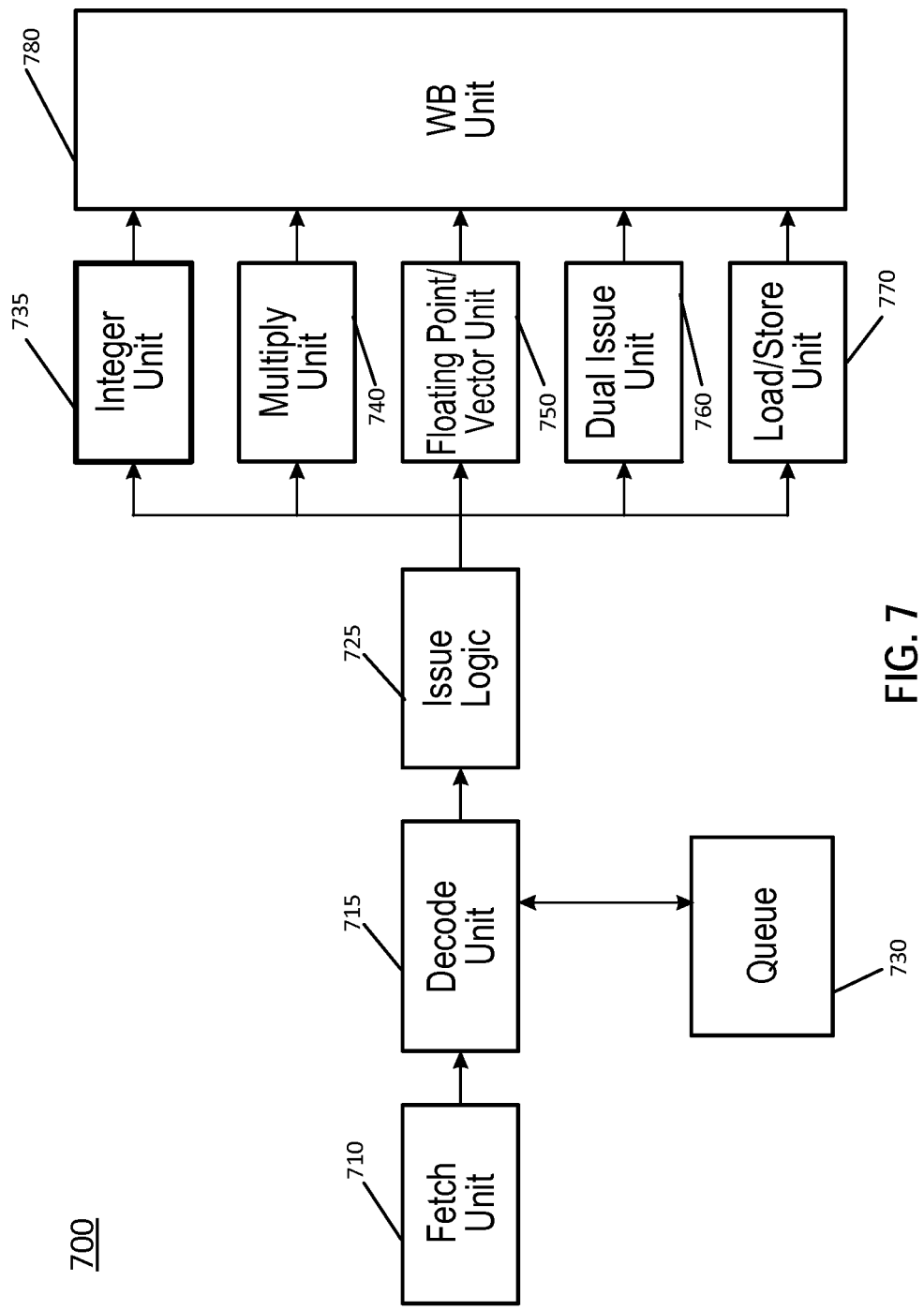
FIG. 7 is a block diagram of a micro-architecture of a processor core in accordance with yet another embodiment.

Referring to FIG. 7, shown is a block diagram of a micro-architecture of a processor core in accordance with yet another embodiment. As illustrated in FIG. 7, a core 700 may include a multi-staged in-order pipeline to execute at very low power consumption levels. As one such example, processor 700 may have a micro-architecture in accordance with an ARM Cortex A53 design available from ARM Holdings, LTD., Sunnyvale, Calif. In an implementation, an 8-stage pipeline may be provided that is configured to execute both 32-bit and 64-bit code. Core 700 includes a fetch unit 710 that is configured to fetch instructions and provide them to a decode unit 715, which may decode the instructions, e.g., macro-instructions of a given ISA such as an ARMv8 ISA. Note further that a queue 730 may couple to decode unit 715 to store decoded instructions. Decoded instructions are provided to an issue logic 725, where the decoded instructions may be issued to a given one of multiple execution units.

With further reference to FIG. 7, issue logic 725 may issue instructions to one of multiple execution units. In the embodiment shown, these execution units include an integer unit 735, a multiply unit 740, a floating point/vector unit 750, a dual issue unit 760, and a load/store unit 770. The results of these different execution units may be provided to a writeback unit 780. Understand that while a single writeback unit is shown for ease of illustration, in some implementations separate writeback units may be associated with each of the execution units. Furthermore, understand that while each of the units and logic shown in FIG. 7 is represented at a high level, a particular implementation may include more or different structures. A processor designed using one or more cores having a pipeline as in FIG. 7 may be implemented in many different end products, extending from mobile devices to server systems.

Figure 8:
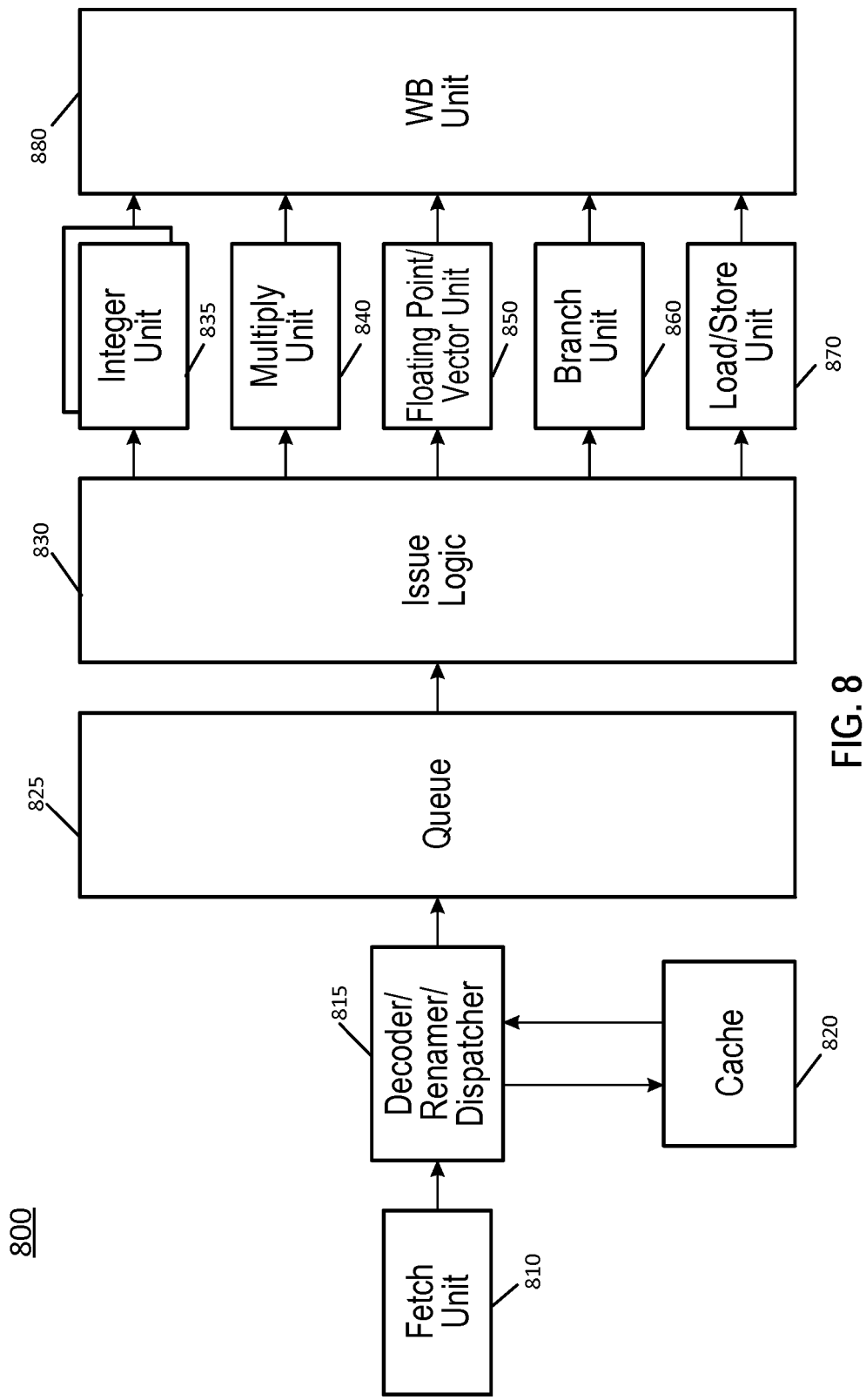
FIG. 8 is a block diagram of a micro-architecture of a processor core in accordance with a still further embodiment.

Referring to FIG. 8, shown is a block diagram of a micro-architecture of a processor core in accordance with a still further embodiment. As illustrated in FIG. 8, a core 800 may include a multi-stage multi-issue out-of-order pipeline to execute at very high performance levels (which may occur at higher power consumption levels than core 700 of FIG. 7). As one such example, processor 800 may have a microarchitecture in accordance with an ARM Cortex A57 design. In an implementation, a 15 (or greater)-stage pipeline may be provided that is configured to execute both 32-bit and 64-bit code. In addition, the pipeline may provide for 3 (or greater)-wide and 3 (or greater)-issue operation. Core 800 includes a fetch unit 810 that is configured to fetch instructions and provide them to a decoder/renamer/dispatcher 815, which may decode the instructions, e.g., macro-instructions of an ARMv8 instruction set architecture, rename register references within the instructions, and dispatch the instructions (eventually) to a selected execution unit. Decoded instructions may be stored in a queue 825. Note that while a single queue structure is shown for ease of illustration in FIG. 8, understand that separate queues may be provided for each of the multiple different types of execution units.

Also shown in FIG. 8 is an issue logic 830 from which decoded instructions stored in queue 825 may be issued to a selected execution unit. Issue logic 830 also may be implemented in a particular embodiment with a separate issue logic for each of the multiple different types of execution units to which issue logic 830 couples.

Decoded instructions may be issued to a given one of multiple execution units. In the embodiment shown, these execution units include one or more integer units 835, a multiply unit 840, a floating point/vector unit 850, a branch unit 860, and a load/store unit 870. In an embodiment, floating point/vector unit 850 may be configured to handle SIMD or vector data of 128 or 256 bits. Still further, floating point/vector execution unit 850 may perform IEEE-754 double precision floating-point operations. The results of these different execution units may be provided to a writeback unit 880. Note that in some implementations separate writeback units may be associated with each of the execution units. Furthermore, understand that while each of the units and logic shown in FIG. 8 is represented at a high level, a particular implementation may include more or different structures.

Note that in a processor having asymmetric cores, such as in accordance with the micro-architectures of FIGS. 7 and 8, workloads may be dynamically swapped for power management reasons, as these cores, although having different pipeline designs and depths, may be of the same or related ISA. Such dynamic core swapping may be performed in a manner transparent to a user application (and possibly kernel also).

Figure 9:
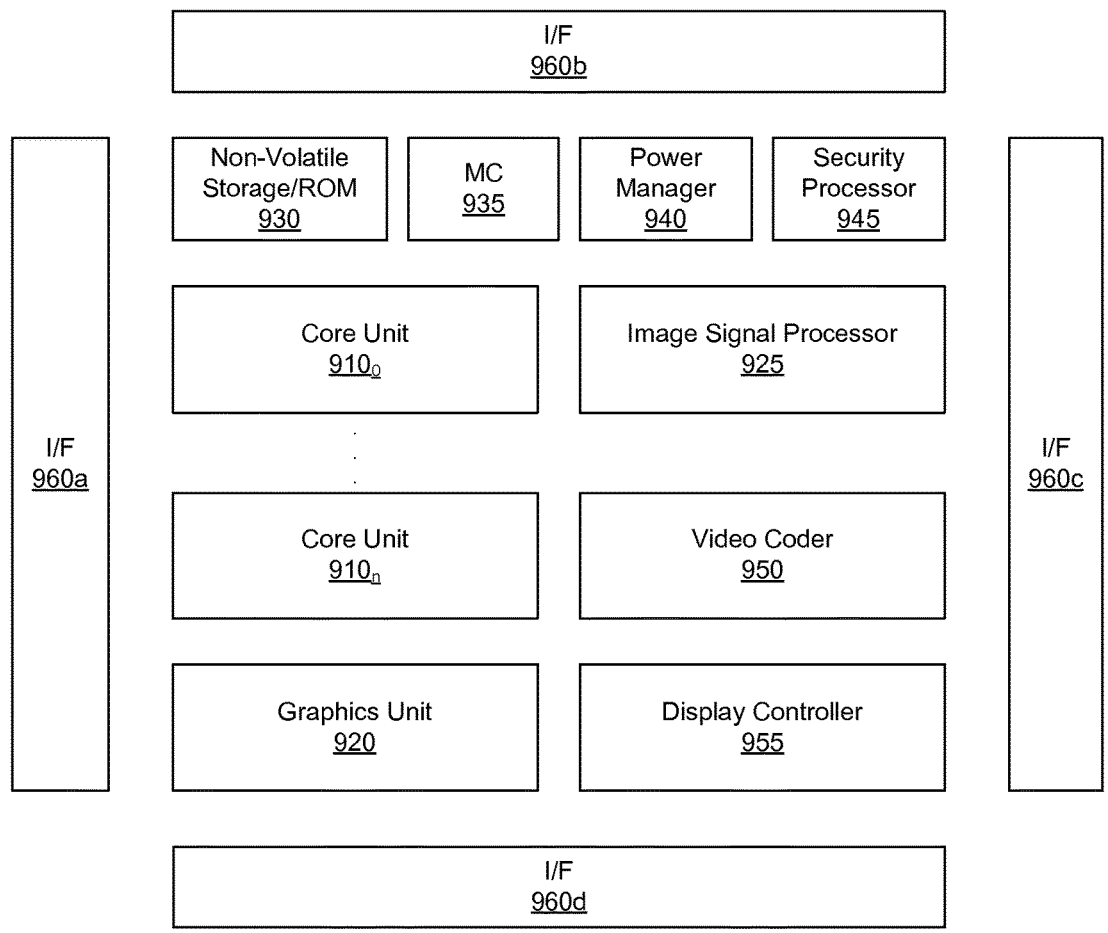
FIG. 9 is a block diagram of a processor in accordance with another embodiment of the present invention.

A processor designed using one or more cores having pipelines as in any one or more of FIGS. 5-8 may be implemented in many different end products, extending from mobile devices to server systems. Referring now to FIG. 9, shown is a block diagram of a processor in accordance with another embodiment of the present invention. In the embodiment of FIG. 9, processor 900 may be a SoC including multiple domains, each of which may be controlled to operate at an independent operating voltage and operating frequency. As a specific illustrative example, processor 900 may be an Intel® Architecture Core™-based processor such as an i3, i5, i7 or another such processor available from Intel Corporation. However, other low power processors such as available from Advanced Micro Devices, Inc. (AMD) of Sunnyvale, Calif., an ARM-based design from ARM Holdings, Ltd. or licensee thereof or a MIPS-based design from MIPS Technologies, Inc. of Sunnyvale, Calif., or their licensees or adopters may instead be present in other embodiments such as an Apple A7 processor, a Qualcomm Snapdragon processor, or Texas Instruments OMAP processor. Such SoC may be used in a low power system such as a smartphone, tablet computer, phablet computer, Ultrabook™ computer or other portable computing device.

In the high level view shown in FIG. 9, processor 900 includes a plurality of core units $910_0$-$910_n$. Each core unit may include one or more processor cores, one or more cache memories and other circuitry. Each core unit 910 may support one or more instructions sets (e.g., an x86 instruction set (with some extensions that have been added with newer versions); a MIPS instruction set; an ARM instruction set (with optional additional extensions such as NEON)) or other instruction set or combinations thereof. Note that some of the core units may be heterogeneous resources (e.g., of a different design). In addition, each such core may be coupled to a cache memory (not shown) which in an embodiment may be a shared level (L2) cache memory. A non-volatile storage 930 may be used to store various program and other data. For example, this storage may be used to store at least portions of microcode, boot information such as a BIOS, other system software or so forth.

Each core unit 910 may also include an interface such as a bus interface unit to enable interconnection to additional circuitry of the processor. In an embodiment, each core unit 910 couples to a coherent fabric that may act as a primary cache coherent on-die interconnect that in turn couples to a memory controller 935. In turn, memory controller 935 controls communications with a memory such as a DRAM (not shown for ease of illustration in FIG. 9).

In addition to core units, additional processing engines are present within the processor, including at least one graphics unit 920 which may include one or more graphics processing units (GPUs) to perform graphics processing as well as to possibly execute general purpose operations on the graphics processor (so-called GPGPU operation). In addition, at least one image signal processor 925 may be present. Signal processor 925 may be configured to process incoming image data received from one or more capture devices, either internal to the SoC or off-chip.

Other accelerators also may be present. In the illustration of FIG. 9, a video coder 950 may perform coding operations including encoding and decoding for video information, e.g., providing hardware acceleration support for high definition video content. A display controller 955 further may be provided to accelerate display operations including providing support for internal and external displays of a system. In addition, a security processor 945 may be present to perform security operations such as secure boot operations, various cryptography operations and so forth.

Each of the units may have its power consumption controlled via a power manager 940, which may include control logic to perform the various power management techniques described herein, including power management for peripheral devices coupled to processor 900.

In some embodiments, SoC 900 may further include a non-coherent fabric coupled to the coherent fabric to which various peripheral devices may couple. One or more interfaces 960a-960d enable communication with one or more off-chip devices. Such communications may be via a variety of communication protocols such as PCIe™, GPIO, USB, I²C, UART, MIPI, SDIO, DDR, SPI, HDMI, among other types of communication protocols. Although shown at this high level in the embodiment of FIG. 9, understand the scope of the present invention is not limited in this regard.

Figure 10:
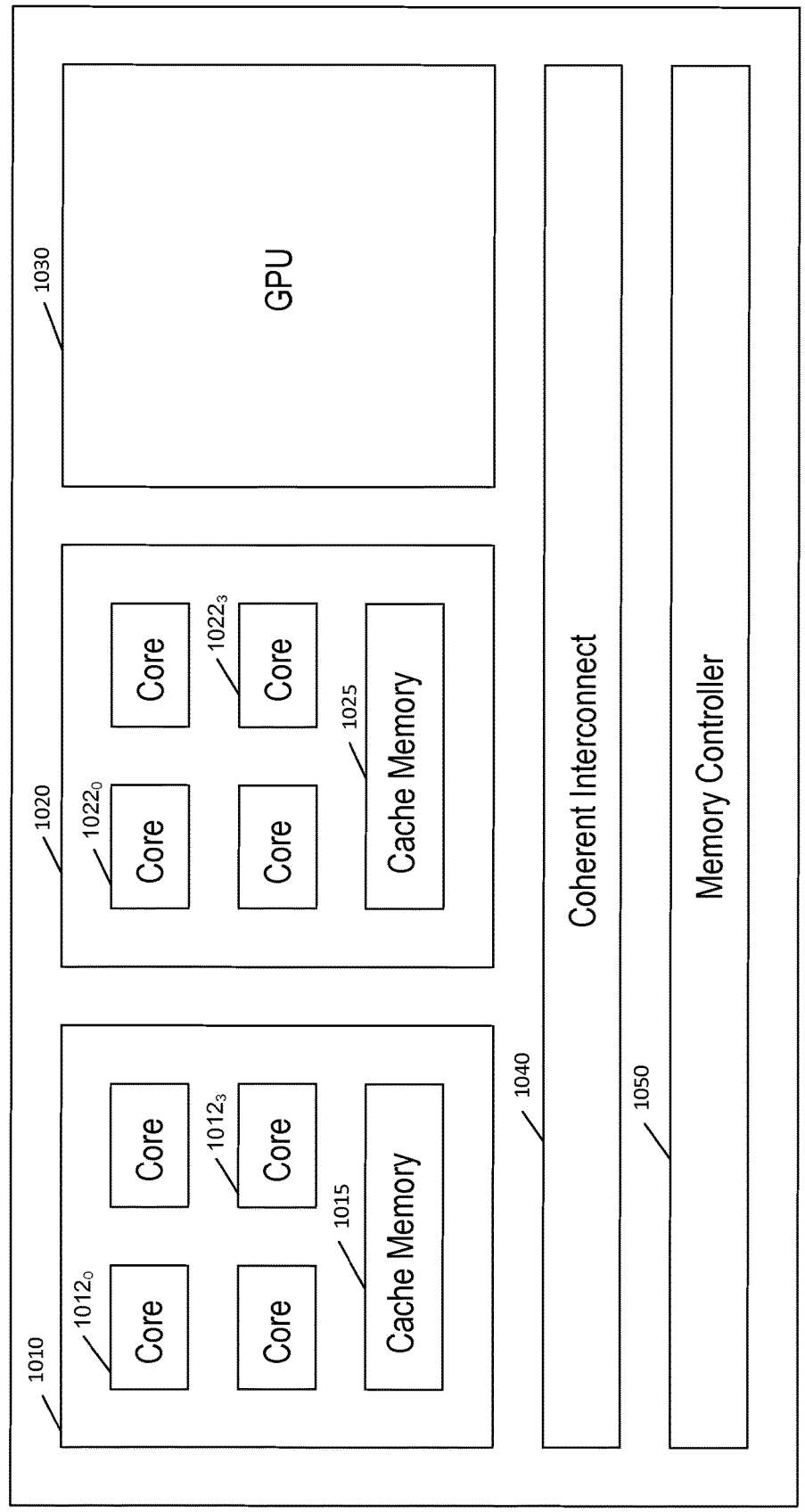
FIG. 10 is a block diagram of a representative SoC in accordance with an embodiment of the present invention.

Referring now to FIG. 10, shown is a block diagram of a representative SoC. In the embodiment shown, SoC 1000 may be a multi-core SoC configured for low power operation to be optimized for incorporation into a smartphone or other low power device such as a tablet computer or other portable computing device. As an example, SoC 1000 may be implemented using asymmetric or different types of cores, such as combinations of higher power and/or low power cores, e.g., out-of-order cores and in-order cores. In different embodiments, these cores may be based on an Intel® Architecture™ core design or an ARM architecture design. In yet other embodiments, a mix of Intel and ARM cores may be implemented in a given SoC.

As seen in FIG. 10, SoC 1000 includes a first core domain 1010 having a plurality of first cores $1012_0$-$1012_3$. In an example, these cores may be low power cores such as in-order cores. In one embodiment these first cores may be implemented as ARM Cortex A53 cores. In turn, these cores couple to a cache memory 1015 of core domain 1010. In addition, SoC 1000 includes a second core domain 1020. In the illustration of FIG. 10, second core domain 1020 has a plurality of second cores $1022_0$-$1022_3$. In an example, these cores may be higher power-consuming cores than first cores 1012. In an embodiment, the second cores may be out-of-order cores, which may be implemented as ARM Cortex A57 cores. In turn, these cores couple to a cache memory 1025 of core domain 1020. Note that while the example shown in FIG. 10 includes 4 cores in each domain, understand that more or fewer cores may be present in a given domain in other examples.

With further reference to FIG. 10, a graphics domain 1030 also is provided, which may include one or more graphics processing units (GPUs) configured to independently execute graphics workloads, e.g., provided by one or more cores of core domains 1010 and 1020. As an example, GPU domain 1030 may be used to provide display support for a variety of screen sizes, in addition to providing graphics and display rendering operations.

As seen, the various domains couple to a coherent interconnect 1040, which in an embodiment may be a cache coherent interconnect fabric that in turn couples to an integrated memory controller 1050. Coherent interconnect 1040 may include a shared cache memory, such as an L3 cache, in some examples. In an embodiment, memory controller 1050 may be a direct memory controller to provide for multiple channels of communication with an off-chip memory, such as multiple channels of a DRAM (not shown for ease of illustration in FIG. 10).

In different examples, the number of the core domains may vary. For example, for a low power SoC suitable for incorporation into a mobile computing device, a limited number of core domains such as shown in FIG. 10 may be present. Still further, in such low power SoCs, core domain 1020 including higher power cores may have fewer numbers of such cores. For example, in one implementation two cores 1022 may be provided to enable operation at reduced power consumption levels. In addition, the different core domains may also be coupled to an interrupt controller to enable dynamic swapping of workloads between the different domains.

In yet other embodiments, a greater number of core domains, as well as additional optional IP logic may be present, in that an SoC can be scaled to higher performance (and power) levels for incorporation into other computing devices, such as desktops, servers, high performance computing systems, base stations forth. As one such example, 4 core domains each having a given number of out-of-order cores may be provided. Still further, in addition to optional GPU support (which as an example may take the form of a GPGPU), one or more accelerators to provide optimized hardware support for particular functions (e.g. web serving, network processing, switching or so forth) also may be provided. In addition, an input/output interface may be present to couple such accelerators to off-chip components.

Figure 11:
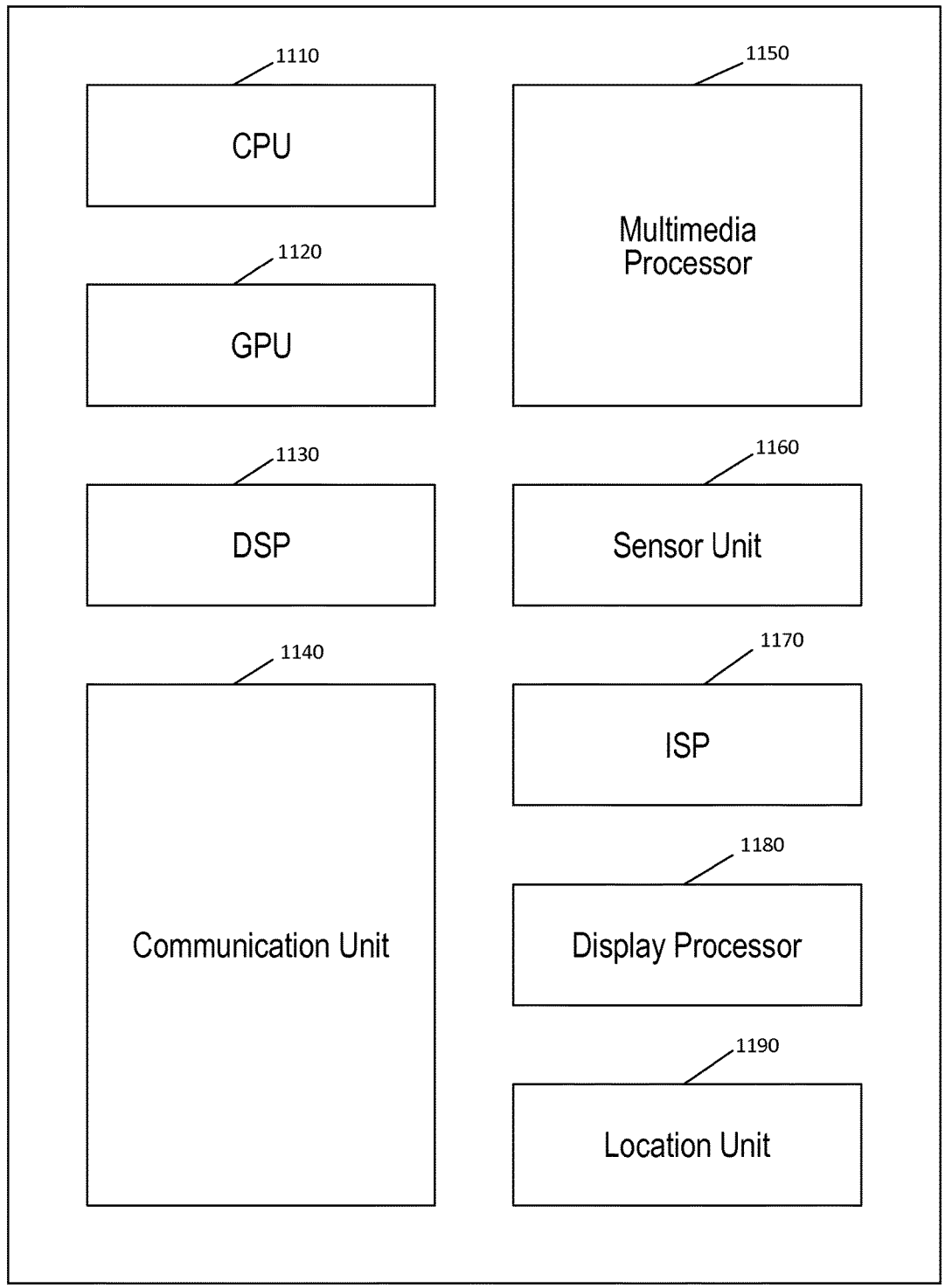
FIG. 11 is a block diagram of another example SoC in accordance with an embodiment of the present invention.

Referring now to FIG. 11, shown is a block diagram of another example SoC. In the embodiment of FIG. 11, SoC 1100 may include various circuitry to enable high performance for multimedia applications, communications and other functions. As such, SoC 1100 is suitable for incorporation into a wide variety of portable and other devices, such as smartphones, tablet computers, smart TVs and so forth. In the example shown, SoC 1100 includes a central processor unit (CPU) domain 1110. In an embodiment, a plurality of individual processor cores may be present in CPU domain 1110. As one example, CPU domain 1110 may be a quad core processor having 4 multithreaded cores. Such processors may be homogeneous or heterogeneous processors, e.g., a mix of low power and high power processor cores.

In turn, a GPU domain 1120 is provided to perform advanced graphics processing in one or more GPUs to handle graphics and compute APIs. A DSP unit 1130 may provide one or more low power DSPs for handling low-power multimedia applications such as music playback, audio/video and so forth, in addition to advanced calculations that may occur during execution of multimedia instructions. In turn, a communication unit 1140 may include various components to provide connectivity via various wireless protocols, such as cellular communications (including 3G/4G LTE), wireless local area protocols such as Bluetooth™, IEEE 802.11, and so forth.

Still further, a multimedia processor 1150 may be used to perform capture and playback of high definition video and audio content, including processing of user gestures. A sensor unit 1160 may include a plurality of sensors and/or a sensor controller to interface to various off-chip sensors present in a given platform. An image signal processor 1170 may be provided with one or more separate ISPs to perform image processing with regard to captured content from one or more cameras of a platform, including still and video cameras.

A display processor 1180 may provide support for connection to a high definition display of a given pixel density, including the ability to wirelessly communicate content for playback on such display. Still further, a location unit 1190 may include a GPS receiver with support for multiple GPS constellations to provide applications highly accurate positioning information obtained using as such GPS receiver. Understand that while shown with this particular set of components in the example of FIG. 11, many variations and alternatives are possible.

Figure 12:
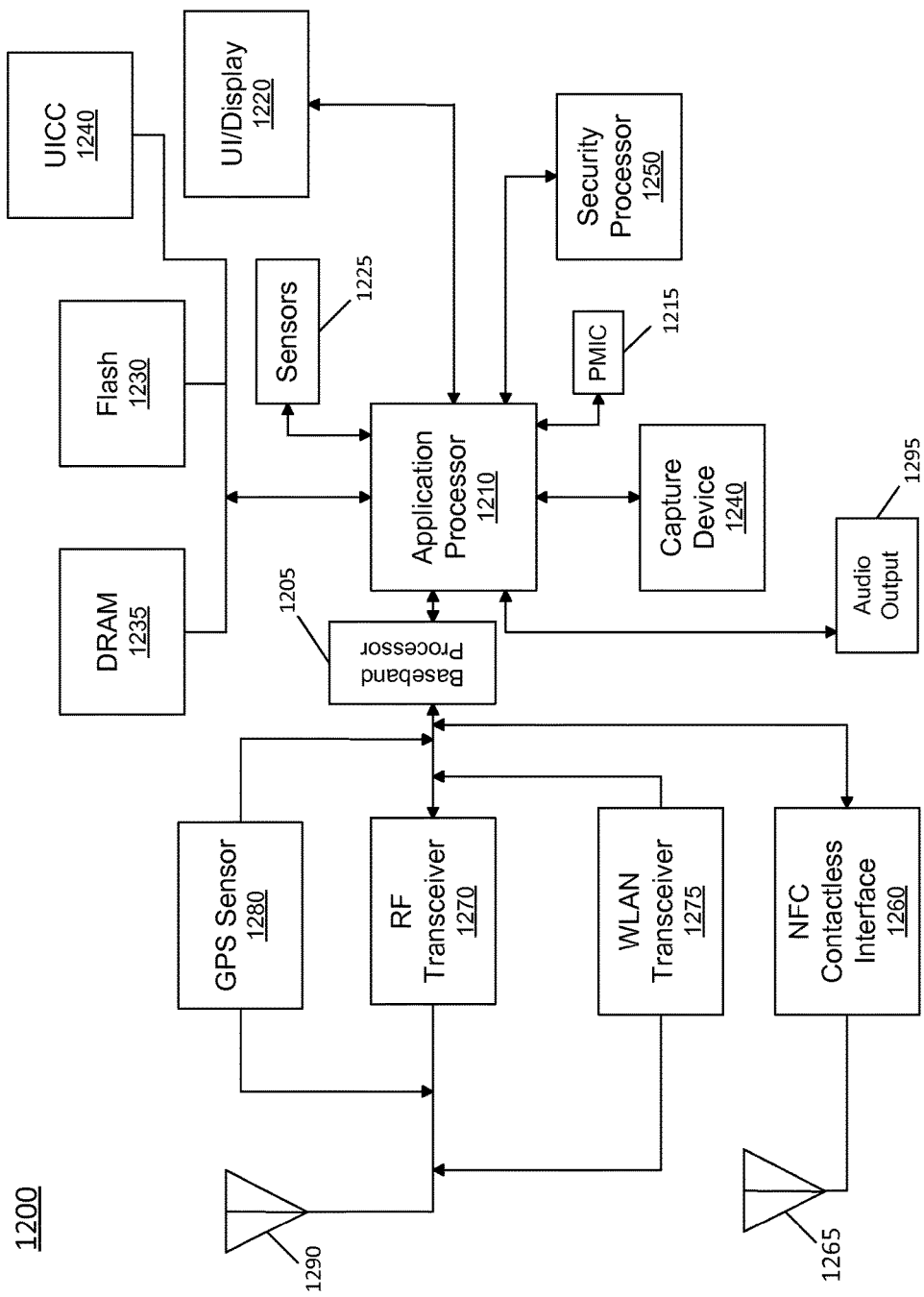
FIG. 12 is a block diagram of an example system with which embodiments can be used.

Referring now to FIG. 12, shown is a block diagram of an example system with which embodiments can be used. As seen, system 1200 may be a smartphone or other wireless communicator. A baseband processor 1205 is configured to perform various signal processing with regard to communication signals to be transmitted from or received by the system. In turn, baseband processor 1205 is coupled to an application processor 1210, which may be a main CPU of the system to execute an OS and other system software, in addition to user applications such as many well-known social media and multimedia apps. Application processor 1210 may further be configured to perform a variety of other computing operations for the device.

In turn, application processor 1210 can couple to a user interface/display 1220, e.g., a touch screen display. In addition, application processor 1210 may couple to a memory system including a non-volatile memory, namely a flash memory 1230 and a system memory, namely a dynamic random access memory (DRAM) 1235. As further seen, application processor 1210 further couples to a capture device 1240 such as one or more image capture devices that can record video and/or still images.

Still referring to FIG. 12, a universal integrated circuit card (UICC) 1240 comprising a subscriber identity module and possibly a secure storage and cryptoprocessor is also coupled to application processor 1210. System 1200 may further include a security processor 1250 that may couple to application processor 1210. A plurality of sensors 1225 may couple to application processor 1210 to enable input of a variety of sensed information such as accelerometer and other environmental information. An audio output device 1295 may provide an interface to output sound, e.g., in the form of voice communications, played or streaming audio data and so forth.

As further illustrated, a near field communication (NFC) contactless interface 1260 is provided that communicates in a NFC near field via an NFC antenna 1265. While separate antennae are shown in FIG. 12, understand that in some implementations one antenna or a different set of antennae may be provided to enable various wireless functionality.

A power management integrated circuit (PMIC) 1215 couples to application processor 1210 to perform platform level power management. To this end, PMIC 1215 may issue power management requests to application processor 1210 to enter certain low power states as desired. Furthermore, based on platform constraints, PMIC 1215 may also control the power level of other components of system 1200. In some embodiments, power control logic described herein to perform device turbo modes may be present in PMIC 1215 and/or distributed between PMIC 1215 and application processor 1210.

To enable communications to be transmitted and received, various circuitry may be coupled between baseband processor 1205 and an antenna 1290. Specifically, a radio frequency (RF) transceiver 1270 and a wireless local area network (WLAN) transceiver 1275 may be present. In general, RF transceiver 1270 may be used to receive and transmit wireless data and calls according to a given wireless communication protocol such as 3G or 4G wireless communication protocol such as in accordance with a code division multiple access (CDMA), global system for mobile communication (GSM), long term evolution (LTE) or other protocol. In addition a GPS sensor 1280 may be present. Other wireless communications such as receipt or transmission of radio signals, e.g., AM/FM and other signals may also be provided. In addition, via WLAN transceiver 1275, local wireless communications can also be realized.

Figure 13:
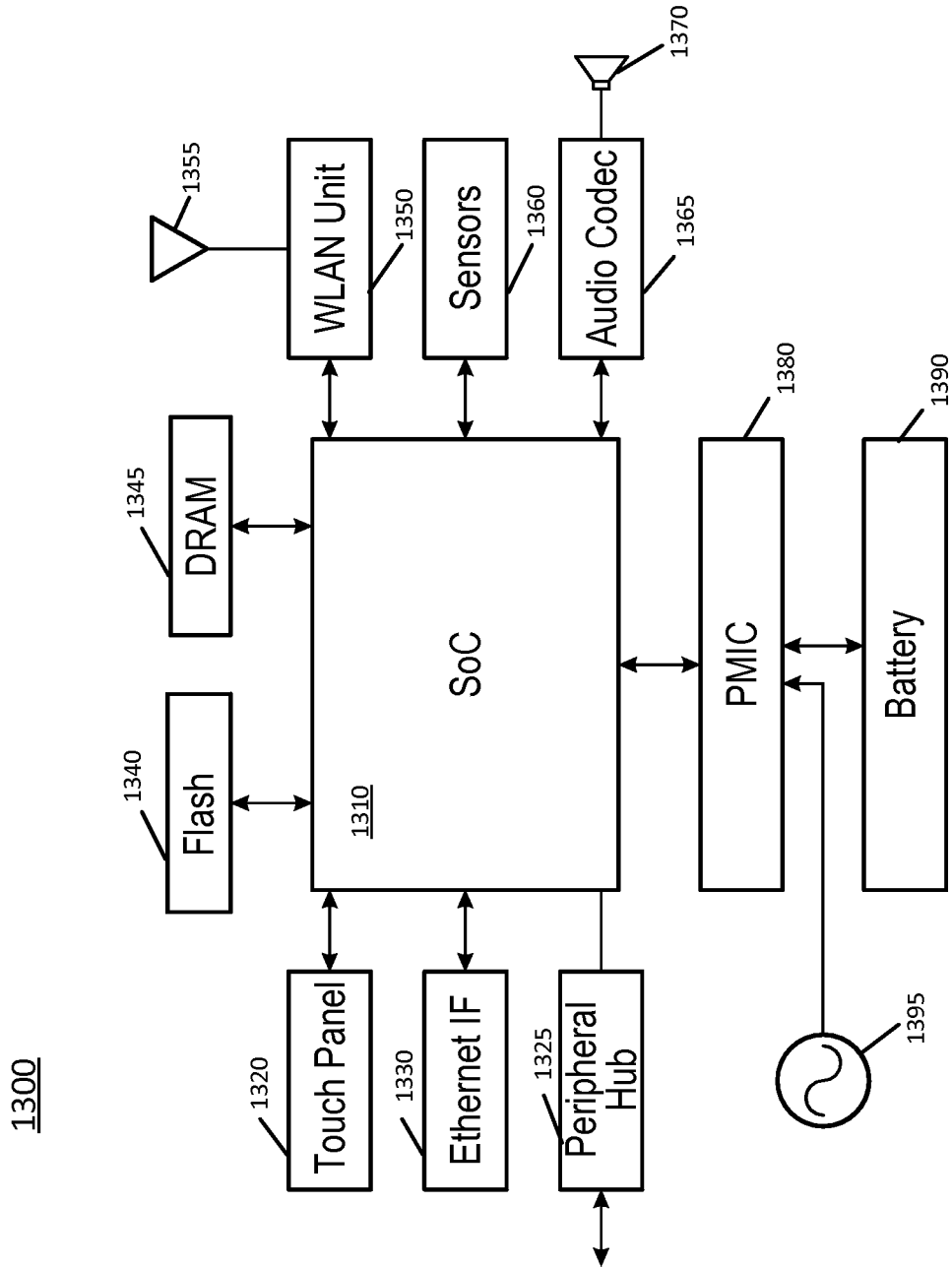
FIG. 13 is a block diagram of another example system with which embodiments may be used.

Referring now to FIG. 13, shown is a block diagram of another example system with which embodiments may be used. In the illustration of FIG. 13, system 1300 may be mobile low-power system such as a tablet computer, 2:1 tablet, phablet or other convertible or standalone tablet system. As illustrated, a SoC 1310 is present and may be configured to operate as an application processor for the device.

A variety of devices may couple to SoC 1310. In the illustration shown, a memory subsystem includes a flash memory 1340 and a DRAM 1345 coupled to SoC 1310. In addition, a touch panel 1320 is coupled to the SoC 1310 to provide display capability and user input via touch, including provision of a virtual keyboard on a display of touch panel 1320. To provide wired network connectivity, SoC 1310 couples to an Ethernet interface 1330. A peripheral hub 1325 is coupled to SoC 1310 to enable interfacing with various peripheral devices, such as may be coupled to system 1300 by any of various ports or other connectors.

In addition to internal power management circuitry and functionality within SoC 1310, a PMIC 1380 is coupled to SoC 1310 to provide platform-based power management, e.g., based on whether the system is powered by a battery 1390 or AC power via an AC adapter 1395. In addition to this power source-based power management, PMIC 1380 may further perform platform power management activities based on environmental and usage conditions. Still further, PMIC 1380 may communicate control and status information to SoC 1310 to cause various power management actions within SoC 1310. In some embodiments, power control logic described herein to perform device turbo modes may be present in PMIC 1380 and/or distributed between PMIC 1380 and SoC 1310.

Still referring to FIG. 13, to provide for wireless capabilities, a WLAN unit 1350 is coupled to SoC 1310 and in turn to an antenna 1355. In various implementations, WLAN unit 1350 may provide for communication according to one or more wireless protocols.

As further illustrated, a plurality of sensors 1360 may couple to SoC 1310. These sensors may include various accelerometer, environmental and other sensors, including user gesture sensors. Finally, an audio codec 1365 is coupled to SoC 1310 to provide an interface to an audio output device 1370. Of course understand that while shown with this particular implementation in FIG. 13, many variations and alternatives are possible.

Figure 14:
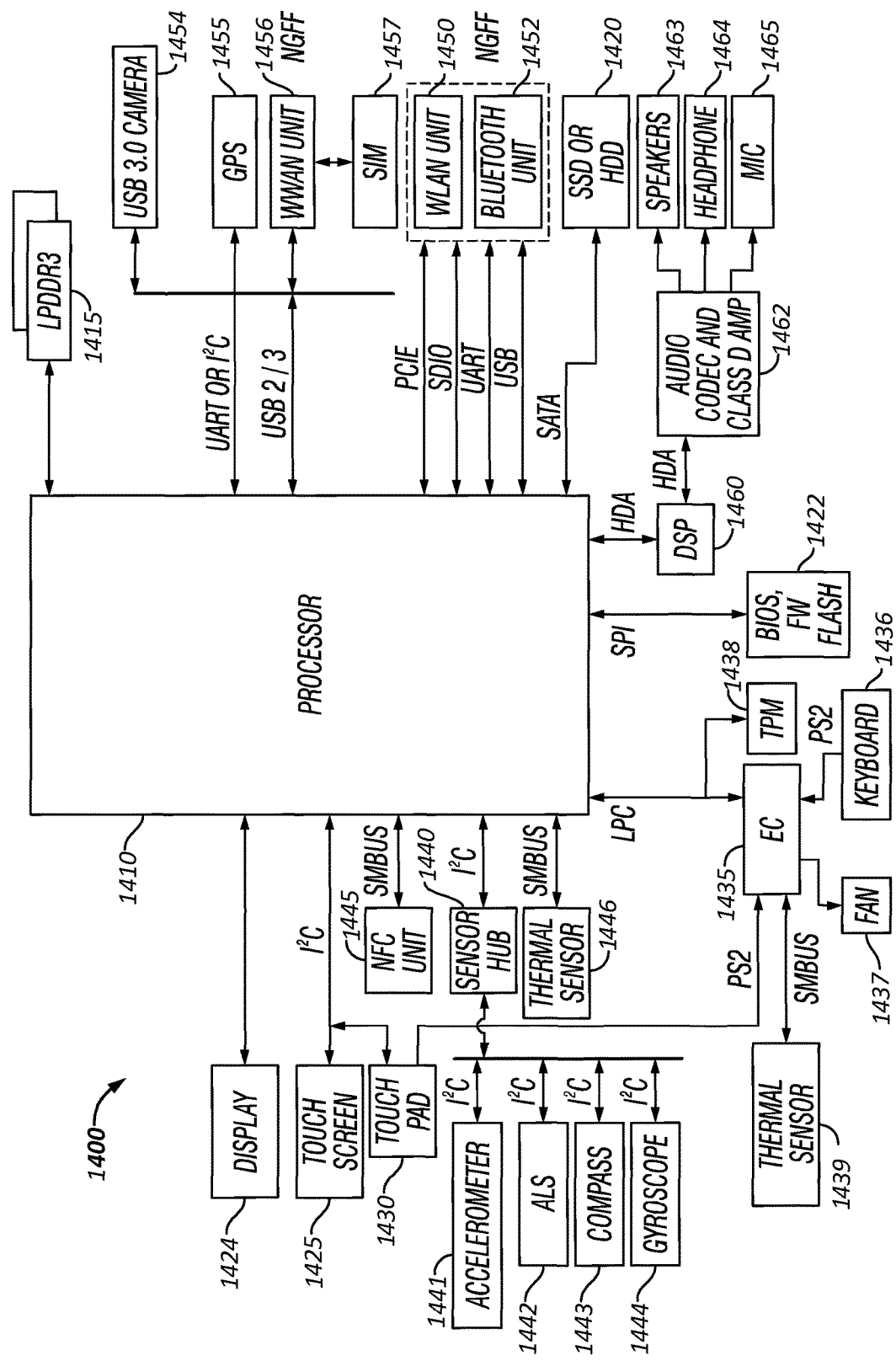
FIG. 14 is a block diagram of a representative computer system.

Referring now to FIG. 14, shown is a block diagram of a representative computer system such as notebook, Ultrabook™ or other small form factor system. A processor 1410, in one embodiment, includes a microprocessor, multi-core processor, multithreaded processor, an ultra low voltage processor, an embedded processor, or other known processing element. In the illustrated implementation, processor 1410 acts as a main processing unit and central hub for communication with many of the various components of the system 1400. As one example, processor 1400 is implemented as a SoC.

Processor 1410, in one embodiment, communicates with a system memory 1415. As an illustrative example, the system memory 1415 is implemented via multiple memory devices or modules to provide for a given amount of system memory.

To provide for persistent storage of information such as data, applications, one or more operating systems and so forth, a mass storage 1420 may also couple to processor 1410. In various embodiments, to enable a thinner and lighter system design as well as to improve system responsiveness, this mass storage may be implemented via a SSD or the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also shown in FIG. 14, a flash device 1422 may be coupled to processor 1410, e.g., via a serial peripheral interface (SPI). This flash device may provide for non-volatile storage of system software, including a basic input/output software (BIOS) as well as other firmware of the system.

Various input/output (I/O) devices may be present within system 1400. Specifically shown in the embodiment of FIG. 14 is a display 1424 which may be a high definition LCD or LED panel that further provides for a touch screen 1425. In one embodiment, display 1424 may be coupled to processor 1410 via a display interconnect that can be implemented as a high performance graphics interconnect. Touch screen 1425 may be coupled to processor 1410 via another interconnect, which in an embodiment can be an $I^2C$ interconnect. As further shown in FIG. 14, in addition to touch screen 1425, user input by way of touch can also occur via a touch pad 1430 which may be configured within the chassis and may also be coupled to the same $I^2C$ interconnect as touch screen 1425.

For perceptual computing and other purposes, various sensors may be present within the system and may be coupled to processor 1410 in different manners. Certain inertial and environmental sensors may couple to processor 1410 through a sensor hub 1440, e.g., via an $I^2C$ interconnect. In the embodiment shown in FIG. 14, these sensors may include an accelerometer 1441, an ambient light sensor (ALS) 1442, a compass 1443 and a gyroscope 1444. Other environmental sensors may include one or more thermal sensors 1446 which in some embodiments couple to processor 1410 via a system management bus (SMBus) bus.

Also seen in FIG. 14, various peripheral devices may couple to processor 1410 via a low pin count (LPC) interconnect. In the embodiment shown, various components can be coupled through an embedded controller 1435. Such components can include a keyboard 1436 (e.g., coupled via a PS2 interface), a fan 1437, and a thermal sensor 1439. In some embodiments, touch pad 1430 may also couple to EC 1435 via a PS2 interface. In addition, a security processor such as a trusted platform module (TPM) 1438 may also couple to processor 1410 via this LPC interconnect.

System 1400 can communicate with external devices in a variety of manners, including wirelessly. In the embodiment shown in FIG. 14, various wireless modules, each of which can correspond to a radio configured for a particular wireless communication protocol, are present. One manner for wireless communication in a short range such as a near field may be via a NFC unit 1445 which may communicate, in one embodiment with processor 1410 via an SMBus. Note that via this NFC unit 1445, devices in close proximity to each other can communicate.

As further seen in FIG. 14, additional wireless units can include other short range wireless engines including a WLAN unit 1450 and a Bluetooth unit 1452. Using WLAN unit 1450, Wi-Fi™ communications can be realized, while via Bluetooth unit 1452, short range Bluetooth™ communications can occur. These units may communicate with processor 1410 via a given link.

In addition, wireless wide area communications, e.g., according to a cellular or other wireless wide area protocol, can occur via a WWAN unit 1456 which in turn may couple to a subscriber identity module (SIM) 1457. In addition, to enable receipt and use of location information, a GPS module 1455 may also be present. Note that in the embodiment shown in FIG. 14, WWAN unit 1456 and an integrated capture device such as a camera module 1454 may communicate via a given link.

An integrated camera module 1454 can be incorporated in the lid. To provide for audio inputs and outputs, an audio processor can be implemented via a digital signal processor (DSP) 1460, which may couple to processor 1410 via a high definition audio (HDA) link. Similarly, DSP 1460 may communicate with an integrated coder/decoder (CODEC)

and amplifier 1462 that in turn may couple to output speakers 1463 which may be implemented within the chassis. Similarly, amplifier and CODEC 1462 can be coupled to receive audio inputs from a microphone 1465 which in an embodiment can be implemented via dual array microphones (such as a digital microphone array) to provide for high quality audio inputs to enable voice-activated control of various operations within the system. Note also that audio outputs can be provided from amplifier/CODEC 1462 to a headphone jack 1464. Although shown with these particular components in the embodiment of FIG. 14, understand the scope of the present invention is not limited in this regard.

Figure 15:
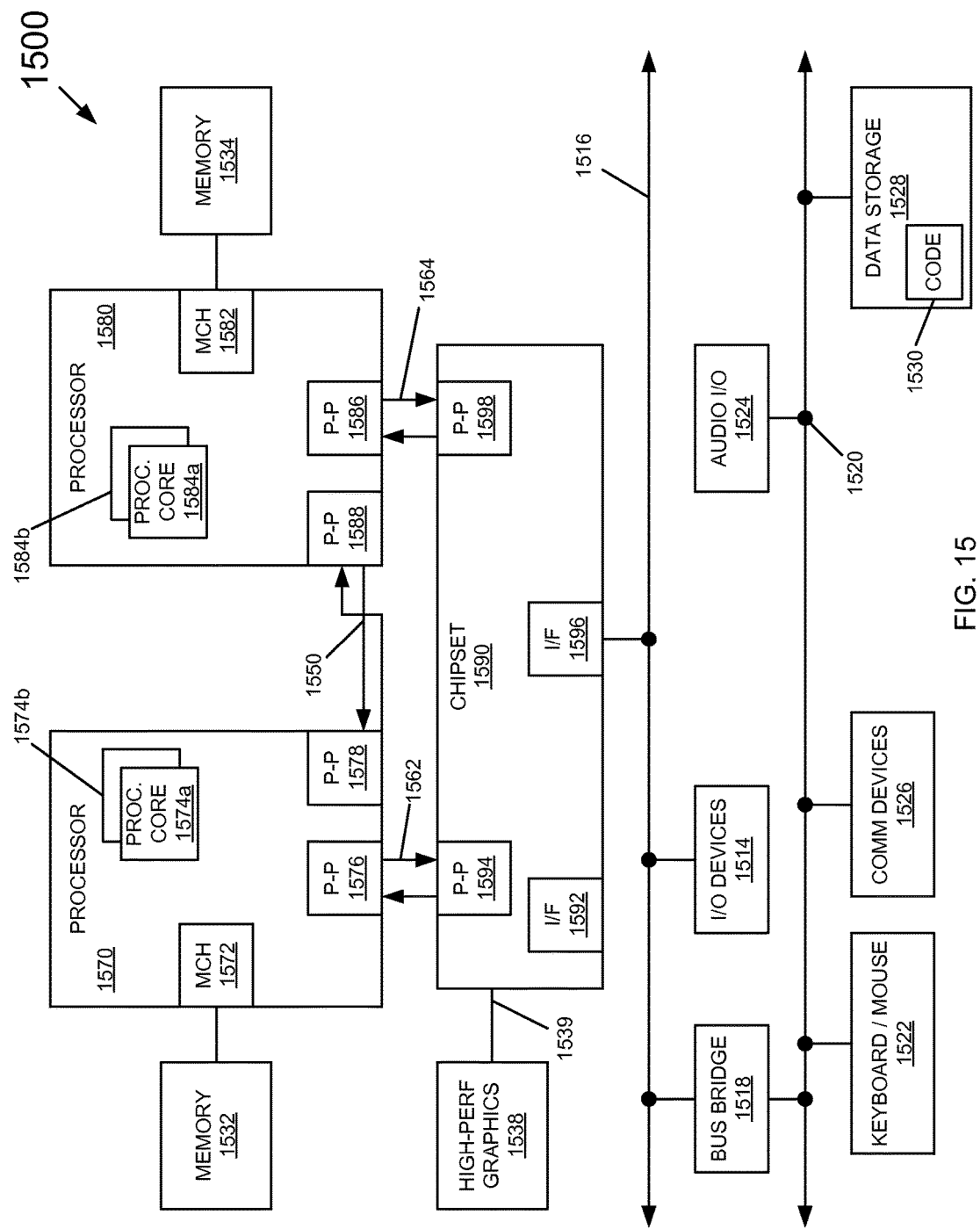
FIG. 15 is a block diagram of a system in accordance with an embodiment of the present invention.

Embodiments may be implemented in many different system types. Referring now to FIG. 15, shown is a block diagram of a system in accordance with an embodiment of the present invention. As shown in FIG. 15, multiprocessor system 1500 is a point-to-point interconnect system, and includes a first processor 1570 and a second processor 1580 coupled via a point-to-point interconnect 1550. As shown in FIG. 15, each of processors 1570 and 1580 may be multicore processors, including first and second processor cores (i.e., processor cores 1574a and 1574b and processor cores 1584a and 1584b), although potentially many more cores may be present in the processors. Each of the processors can include a PCU or other power management logic to perform processor-based power management as described herein, including control of various other components of system 1500 to enable device turbo mode operations.

Still referring to FIG. 15, first processor 1570 further includes a memory controller hub (MCH) 1572 and point-to-point (P-P) interfaces 1576 and 1578. Similarly, second processor 1580 includes a MCH 1582 and P-P interfaces 1586 and 1588. As shown in FIG. 15, MCH's 1572 and 1582 couple the processors to respective memories, namely a memory 1532 and a memory 1534, which may be portions of system memory (e.g., DRAM) locally attached to the respective processors. First processor 1570 and second processor 1580 may be coupled to a chipset 1590 via P-P interconnects 1562 and 1564, respectively. As shown in FIG. 15, chipset 1590 includes P-P interfaces 1594 and 1598.

Furthermore, chipset 1590 includes an interface 1592 to couple chipset 1590 with a high performance graphics engine 1538, by a P-P interconnect 1539. In turn, chipset 1590 may be coupled to a first bus 1516 via an interface 1596. As shown in FIG. 15, various input/output (I/O) devices 1514 may be coupled to first bus 1516, along with a bus bridge 1518 which couples first bus 1516 to a second bus 1520. Various devices may be coupled to second bus 1520 including, for example, a keyboard/mouse 1522, communication devices 1526 and a data storage unit 1528 such as a disk drive or other mass storage device which may include code 1530, in one embodiment. Further, an audio I/O 1524 may be coupled to second bus 1520. Embodiments can be incorporated into other types of systems including mobile devices such as a smart cellular telephone, tablet computer, netbook, Ultrabook™, or so forth.

Figure 16:
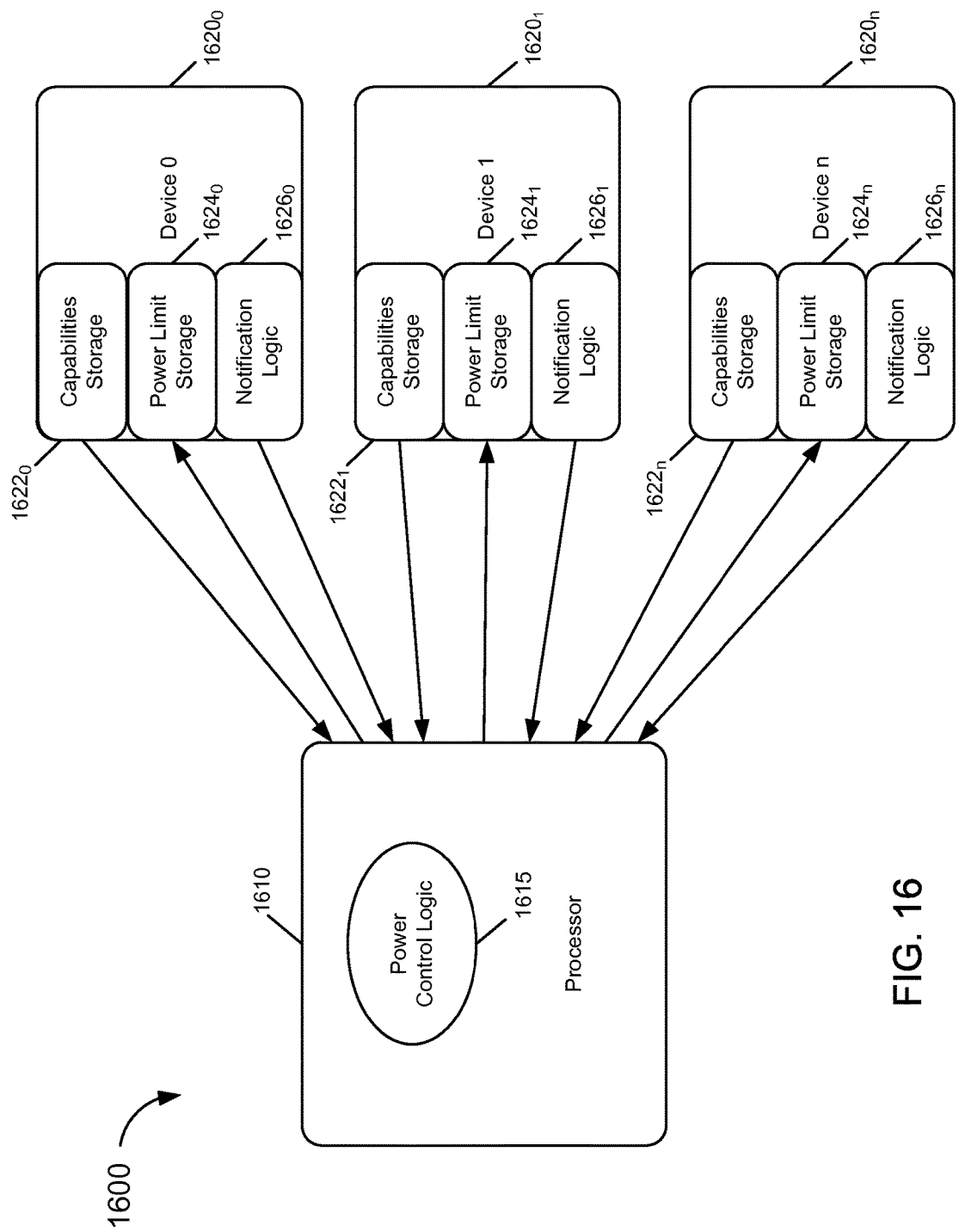
FIG. 16 is a block diagram of a portion of a system in accordance with an embodiment.

Referring now to FIG. 16, shown is a block diagram of a portion of a system in accordance with an embodiment. In the embodiment of FIG. 16, assume that system 1600 is a given platform, e.g., a mobile device such as a smartphone, tablet computer, phablet, e-reader or so forth. In the embodiment shown, system 1600 includes a processor 1610 which may be a multicore processor including a power control logic 1615 as described herein. Power control logic 1615 may take many different forms, from standalone hardware, microcontroller, logic of a PCU or other power control entity, among other possible implementations. In general, power control logic 1615 may dynamically allocate power limits to a variety of devices of the system based on current operating conditions and thus can ensure that these devices receive a particular power level to enable a variety of use cases to occur. In various embodiment, power control logic 1615 may include or be associated with a policy logic (not shown for ease of illustration in FIG. 16) to enable decisions to be made to rebalance power between components as needed. Embodiments may thus improve the performance of system components within a fixed power envelope, and/or reduce platform power costs and complexity by actively managing power needs for a given set of platform components.

Still with reference to FIG. 16, a plurality of devices $1620_0$-$1620_n$ are present. As examples, these devices may take the form of one or more integrated circuits such as a GPS device, a wireless interface, a camera device or so forth. Still further, one or more of devices 1620 may take other forms, such as a flash device used in connection with a capture device such as a still or video camera device. Note that the term "device" encompasses more than a single component, as in some cases a device may be a subsystem formed of constituent components.

In the embodiment shown, each device 1620 includes an interface mechanism to enable interaction between power control logic 1615 and the corresponding device. In the embodiment of FIG. 16 this interface mechanism includes a capabilities storage $1622_0$-$1622_n$, a power limit storage $1624_0$-$1624_n$, and a notification logic $1626_0$-$1626_n$. Capabilities storage 1622 may be configured to store a set of power levels for the device. This capabilities storage in an embodiment may be a non-volatile storage to store a set of power levels at which the device can operate in certain states (and in given time frames). In one embodiment, a minimum of three power levels may be provided for each time frame of interest for which power may be controlled. In an embodiment, the three power levels include a maximum power level, which may correspond to a highest power consumption level at which a maximum use case for the device occurs, a typical power level, which may correspond to a nominal power consumption level at which a normal use case for the device occurs, and a minimum power level, which may correspond to a lowest power consumption level at which a minimal use case for the device can occur. Such capabilities storage 1622 may be written during manufacture of the device based on design information, testing or characterization information or so forth.

In turn, power limit storage 1624 may be configured to store a power limit, which may be an indication of the current level at which the device is allocated to be powered based on current system operating conditions. This power limit storage may be provided with a power limit value (e.g., corresponding to one of a maximum, minimum or typical level for each of the replacement time frames) received from processor 1610. More specifically in an embodiment, power control logic 1615 may communicate a power limit (e.g., selected from one of the multiple power levels provided as power capability information, or a determined or calculated power limit) for each time frame to be programmed (e.g., instantaneous, intermediate and long term or average). Still with reference to FIG. 16, device 1620 further includes a notification logic 1626. In general, notification logic 1626 may be configured, based on information regarding current and future operation of the device, to notify processor 1610 (and more specifically power control logic 1615) of a request for an increased power state, such as for an increased power state due to higher device usage (e.g., triggering of a flash to take a picture, causing higher GPS device usage to lock onto a current location or so forth).

Thus in various embodiments, the interface mechanism may be provided to dynamically configure power limits of each device over various time windows. For example, a device may be configured to consume no more than 1 Watt (W) averaged over long time periods, e.g., 1 second (s), no more than 1.5 W over intermediate (e.g., 10 millisecond (ms)) time periods, and no more than 2 W as an instantaneous upper limit. The device (including associated firmware and/or other control logic of the device) may be configured to enforce these power limits.

In some embodiments, the interface mechanism may enable a device to communicate feedback information in the form of a device notification that the device requires a higher than currently programmed power level for a given time frame and/or use case. As such, power control logic 1615 may then implement a power management policy to provide for device turbo modes in which a platform power budget may be dynamically re-balanced, while allowing the overall platform to be designed for a smaller maximum power level. When re-balanced the device receiving an increased power allocation may thus operate in a turbo mode in which one or more operating parameters (e.g., frequency) may be increased higher than a nominal (e.g., guaranteed) limit, such that the device may perform a given use case (by having sufficient power) and/or perform the use case at a higher performance level.

In an embodiment, a source device 1620₁ sends a notification to inform power control logic 1615 that there is a transient need for increased power beyond the programmed power limit. This notification message may include a requested power level for each time frame and (optionally) a request code or other information to indicate a reason for the request such as a particular use case.

Note that communication between power control logic 1615 and devices 1620 may be by way of a handshake process, generally proceeding as follows. First, power control logic 1615 allocates available power budget to each component for normal operation (e.g., based at least in part on information or determinations made involving an OS and/or system firmware). This allocation may be done by setting the power limit for each component to a typical value for that device. When a device 1620₁ requires a power level higher than the configured limit, it sends a notification to power control logic 1615. In turn, the power control logic reads the new power level required, and associated request information (e.g., informing of the reason or use case). Depending on the use case, power control logic 1615 may then grant the request by configuring a new (higher) power limit temporarily. When device 1620 has completed the use case, it sends another notification to power control logic 1615, with a lower (e.g., typical) requested power limit. In turn, power control logic 1615 returns the power limit to the normal levels, and operation continues.

Understand while shown at this high level in the embodiment of FIG. 16, many variations and alternatives are possible. For example, while described in FIG. 16 in the context of a platform-based system such as a portable device having a circuit board including a multicore processor and other integrated circuits (and/or one or more peripheral devices coupled thereto), in other embodiments a system incorporating an embodiment of the present invention may be a system on chip configured on a single semiconductor die having disparate IP logic blocks, e.g., of different vendors and having different functionality and capabilities (including power capabilities), such that a common power control for dynamic use cases of the different IP blocks can be realized. Still further, power control logic as described herein may be implemented as a separate component of a platform (e.g., a separate integrated circuit).

In one example consider a platform with a processor, a GPS device and a 4G data connection device. The GPS device may need to consume additional power for a few seconds for an initial lock operation to lock onto GPS satellites, after which it can consume lower power to track its position. With a device turbo mode, the power control logic may be configured to increase the power limit for the GPS device for the particular use case to acquire its position by way of an initial lock operation. To this end, if sufficient power headroom is not available, the power control logic may, as an example, cause the 4G data communication device (e.g., 4G modem) to reduce its power consumption level (and thus data speed) to compensate for this increase. Once satellite lock is acquired, the original power limits for both devices can be returned to their normal levels. This operation enables the GPS device to have a burst capability to acquire lock faster.

In another example, consider a platform with a processor, a display, a camera, a flash and a wireless modem (among other components). When the user takes a picture, charging or operating the flash consumes a burst of electrical power. If the processor is busy running a background task or downloading wireless data at that point, the platform total power consumption may reach (or potentially exceed) a platform power budget. Using an embodiment having device turbo mode capability, a power control logic can program a lower power limit for the processor (which may accommodate this limit by reducing operating frequency) and the wireless modem (which may accommodate this limit by reducing data transfer speed) just before the flash consumes higher power in illumination, and then return these devices to normal levels after the flash operation is completed. In this way, a combined maximum electrical load on the platform is reduced.

Embodiments thus enable active management of device power limits based on use case, realizing a platform having lower platform power design limits. Alternately, embodiments may be used to combine higher performance components within the same platform power envelope.

Figure 17:
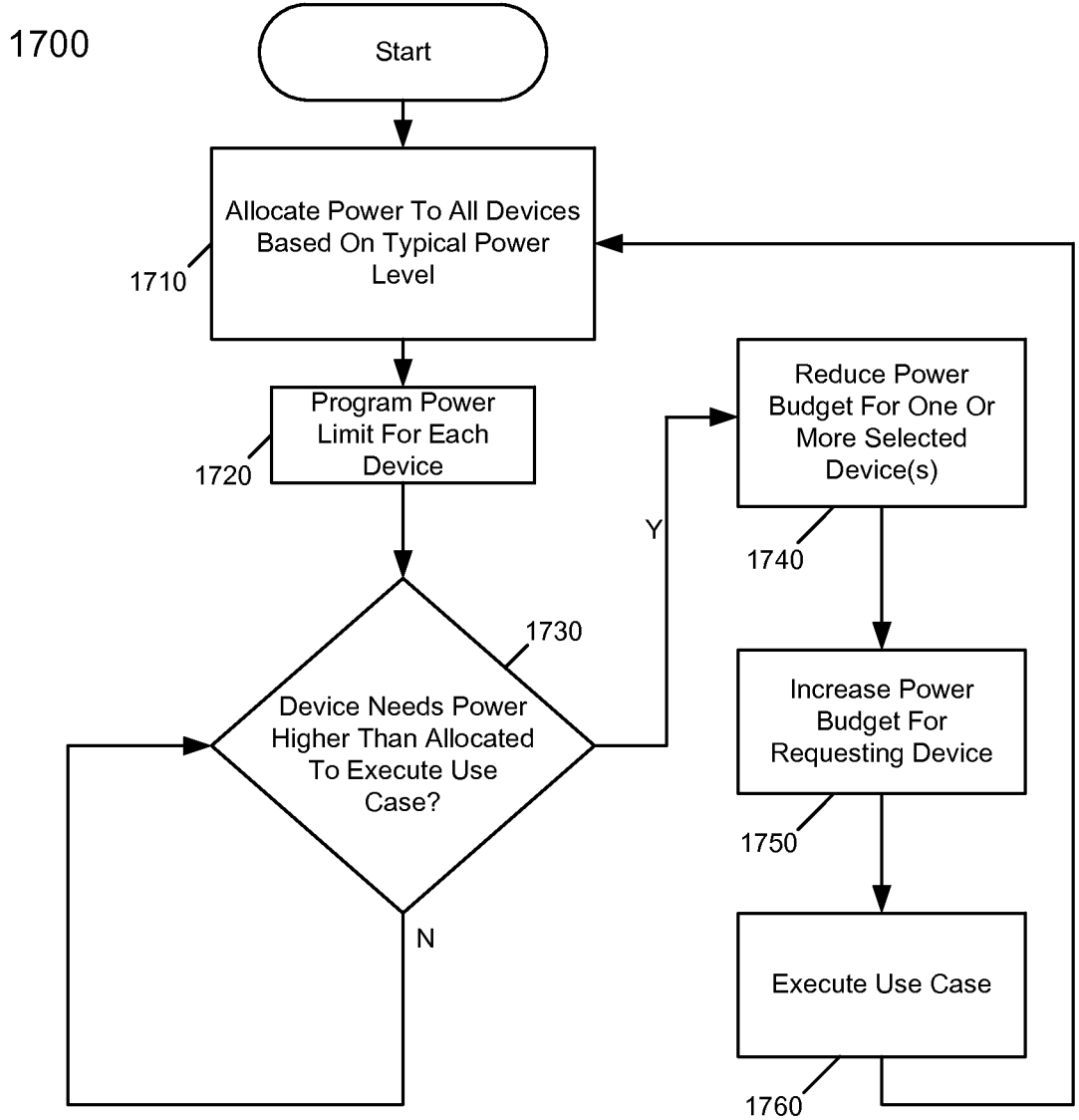
FIG. 17 is a flow diagram of a method for dynamically controlling power limits for devices of a system in accordance with an embodiment of the present invention.

Referring now to FIG. 17, shown is a flow diagram of a method for dynamically controlling power limits for devices of a system in accordance with an embodiment of the present invention. In an embodiment, method 1700 may be performed by a power control logic of a processor, which can be implemented using a given hardware logic. Such logic can range from one or more dedicated microcontrollers or hard coded logic, to a general-purpose processor core. As seen, method 1700 begins by allocating power to all of the devices of the system based on a typical power level for these devices (block 1710). For example, on power up of a system, each device may communicate its capabilities for operation at multiple power levels, such as minimum, typical and maximum levels to the power control logic, for time frames of interest. After such allocation, control passes to block 1720 where a power limit for each device may be programmed. To this end, the power control logic may communicate the allocated power limit (e.g., in terms of Watts) to each device (for each relevant time frame) for storage in a power limit storage of the corresponding device. As such, at this point each device of the system is configured to begin operation at a normal operation level with a typical power consumption level. That is, each device may be configured to read the power limit (e.g., as expressed in terms of Watts) and correlate this power level to appropriate operating conditions to ensure operation of the device at or below this power level, such as by way of appropriate frequency and voltage levels.

Method 1700 continues at diamond 1730, where it is determined whether a device needs a higher power level to execute a given use case. Such determination may be based upon receipt of a notification from one or more devices of a request for a higher power consumption level. In the situation where multiple requests are received, such requests may be handled in a given priority order based on a relative priority of the devices (or priority of use cases) as determined with reference, e.g., to one or more tables. In an embodiment, these received notifications may include an indication of a requested power level and/or an indication of the use case, such as data communication speed, GPS lock operation or flash illumination. If no device sends a request for a higher power level as determined at diamond 1730, no further action occurs and control may loop back (e.g., after a given interval) to diamond 1730.

Still with reference to FIG. 17, assume a request is received from a first device. Control thus passes to block 1740 where a power budget can be reduced for one or more selected devices. More specifically, these one or more devices may be devices that can be placed into a lower operation state during the current use case. This determination may be made with reference to a table that associates a given use case with devices to be active during such use case. For example, assume that a flash is to be illuminated for a picture to be taken. In this case, other operations such as data communication, GPS operation, or so forth are not necessary and thus devices associated with such uses may be placed into a lower power state (which in some cases may be a low power state such as a sleep state in which the device is not actively performing operations).

In some situations, only a single device may need to have its power level reduced to enable a higher power level to be allocated to the requesting device, as the reduced power consumption of one device can be allocated to the requesting device while the entire system remains within a given power budget. Yet in other cases, more than one other device may have its power limit reduced to enable a requested power level to be allocated to a requesting device. While not shown for ease of illustration understand that the power control logic may send an updated power level signal to such devices to cause the power consumption to be reduced.

With further reference to FIG. 17, control passes next to block 1750 where a power budget increase may be provided to the requesting device. For example, an increased power limit response may be sent from the power control logic to the device to enable the device to update its power limit storage accordingly and enable the device to operate at this higher power limit. As such, control passes to block 1760 where the use case for this device may be executed. For example, the flash may be illuminated when sufficient power is available and the flash is appropriately charged. Thereafter, control passes back to block 1710, where all devices may be allocated back to typical levels after the use case is completed. Note that the return from block 1760 to block 1710 may occur automatically after passage of a predetermined time for the use case (e.g., as set forth in a table and indicated to the device) or responsive to an indication from the device that it has completed its (high power consumption) use case. Understand while shown at this high level in the embodiment of FIG. 17, many variations may occur.

Figure 18:
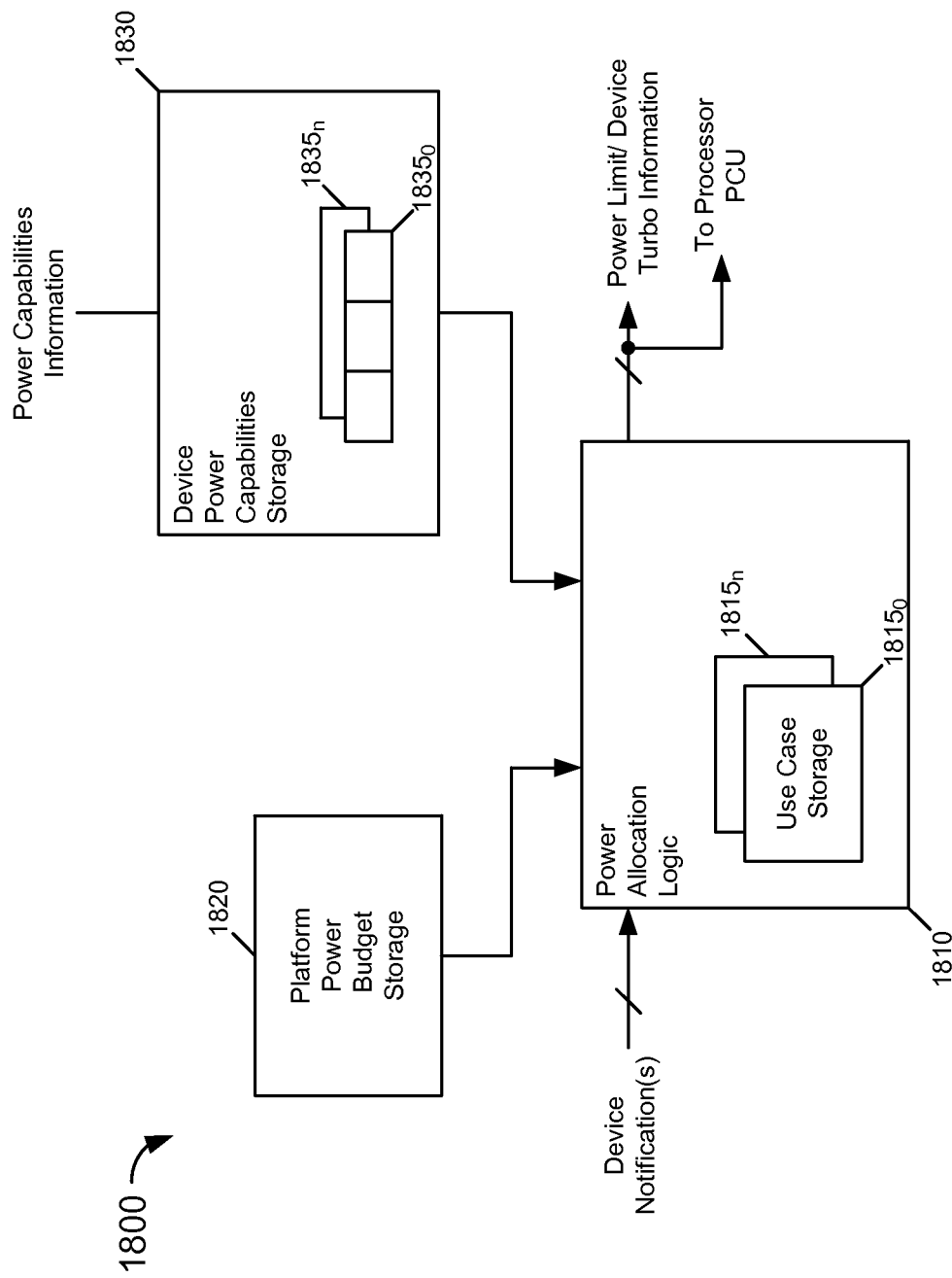
FIG. 18 is a block diagram of a power control logic in accordance with an embodiment of the present invention.

Referring now to FIG. 18, shown is a block diagram of a power control logic in accordance with an embodiment of the present invention. As shown in FIG. 18, a power control logic 1800 includes constituent components, which may be implemented in various combinations of hardware, software, and/or firmware. In an embodiment, logic 1800 may be implemented using hardwired logic of a processor (as in power control logic 1615 of FIG. 16) such as one or more dedicated microcontrollers including or associated with appropriate storages.

As illustrated in FIG. 18, power control logic 1800 includes a power allocation logic 1810, a platform power budget storage 1820, and a device power capabilities storage 1830. In general, power allocation logic 1810 may be configured to receive a variety of incoming information and allocate a platform power budget to the devices of the platform (including the processor itself). Such allocations may be performed on power up of the platform, and may be dynamically updated as appropriate to accommodate a variety of use cases by enabling one or more devices to enter into a device turbo mode to perform a particular use case operation, and thereafter return to an original allocation (which may be updated yet again to accommodate another use case of the same or other devices).

As seen, power control logic 1810 includes (or is associated with) use case storages $1815_0$-$1815_n$ (each associated with a particular use case of a given device or combination of devices). Although the scope of the present invention is not limited in this regard, in an embodiment each use case storage 1815 may store information regarding a use case, such as a particular use case operation by a primary device (which is to perform the primary operation of the use case), an associated power level for that device to enable performance of the use case operation, and a list of one or more other devices involved in the use case scenario. In addition, identification of one or more non-used devices for the use case also may be stored. Of course understand while described with this particular information in the example of FIG. 18, many variations and alternatives of use case storage are possible.

Still with reference to FIG. 18, a platform power budget storage 1820 is coupled to power allocation logic 1810. In an embodiment, storage 1820 may be a configuration storage, such as a non-volatile memory configured to store a total platform power budget (e.g., in terms of Watts). Using an embodiment of the present invention, such platform power budget may be at a lower level than if a platform were designed for a worst-case scenario in which each device of the platform were to concurrently operate at a maximum power level. As such, this platform power budget may be set upon design and manufacture of the platform, and may be at least a level at which each device of the platform is enabled to concurrently operate at a nominal power level, optionally with some amount of additional power headroom to enable one or more of the devices to operate at higher power consumption levels.

As also shown in FIG. 18, a device power capabilities storage 1830 is coupled to power allocation logic 1810. In the embodiment shown, capabilities storage 1830 includes a plurality of entries $1835_0$-$1835_n$, where each entry 1835 is associated with a particular device of the platform. In an embodiment, each entry 1835 includes a plurality of fields each to store one of multiple power levels for the device. As in the example described herein, there may be 3 fields per entry (per time frame of interest), each to store one of a minimum, nominal and maximum power level for the device. This information regarding the power capabilities of the different devices may be communicated from the devices themselves to storage 1830 on device power up, such as during boot operations. To this end, each device may include a firmware or other control logic both to maintain this power capability information and communicate the information to power control logic 1800 during boot operations.

As further illustrated in FIG. 18, power allocation logic 1810 receives the platform power budget information and the device power capabilities information, and based on such information may allocate the platform power budget among the various devices. In an embodiment, during power up and normal use operations, each device may be allocated its nominal power level and thus power allocation logic 1810 may send power allocation messages to the different devices such that each device may operate at its nominal power level. In an embodiment, such device allocation messages may include a power level (e.g., the nominal power level) in terms of Watts, as each device may be configured to include firmware or other control logic to comprehend this power information and control one or more operating parameters of the corresponding device (e.g., voltage and/or frequency) to enable operation at the allocated power level.

In addition, when during platform operation a particular device seeks to execute a use case operation that may require a higher power level, the device may issue a device notification to power control logic 1800 (and more specifically to be received by power allocation logic 1810). In turn, power allocation logic 1810 may determine whether sufficient power headroom is available in the platform power budget to enable this use case to occur. If so, a device turbo message may be sent to the corresponding device to enable the device to operate at a higher power level to accomplish the use case. If instead insufficient power headroom is available, power allocation logic 1810 may determine whether one or more other devices (including the processor itself) may be provided with a reduced power allocation to enable the use case to occur (or not, depending on platform constraints such as thermal or electrical constraints). Understand while shown at this high level in the embodiment of FIG. 18, many variations and alternatives are possible.

Figure 19:
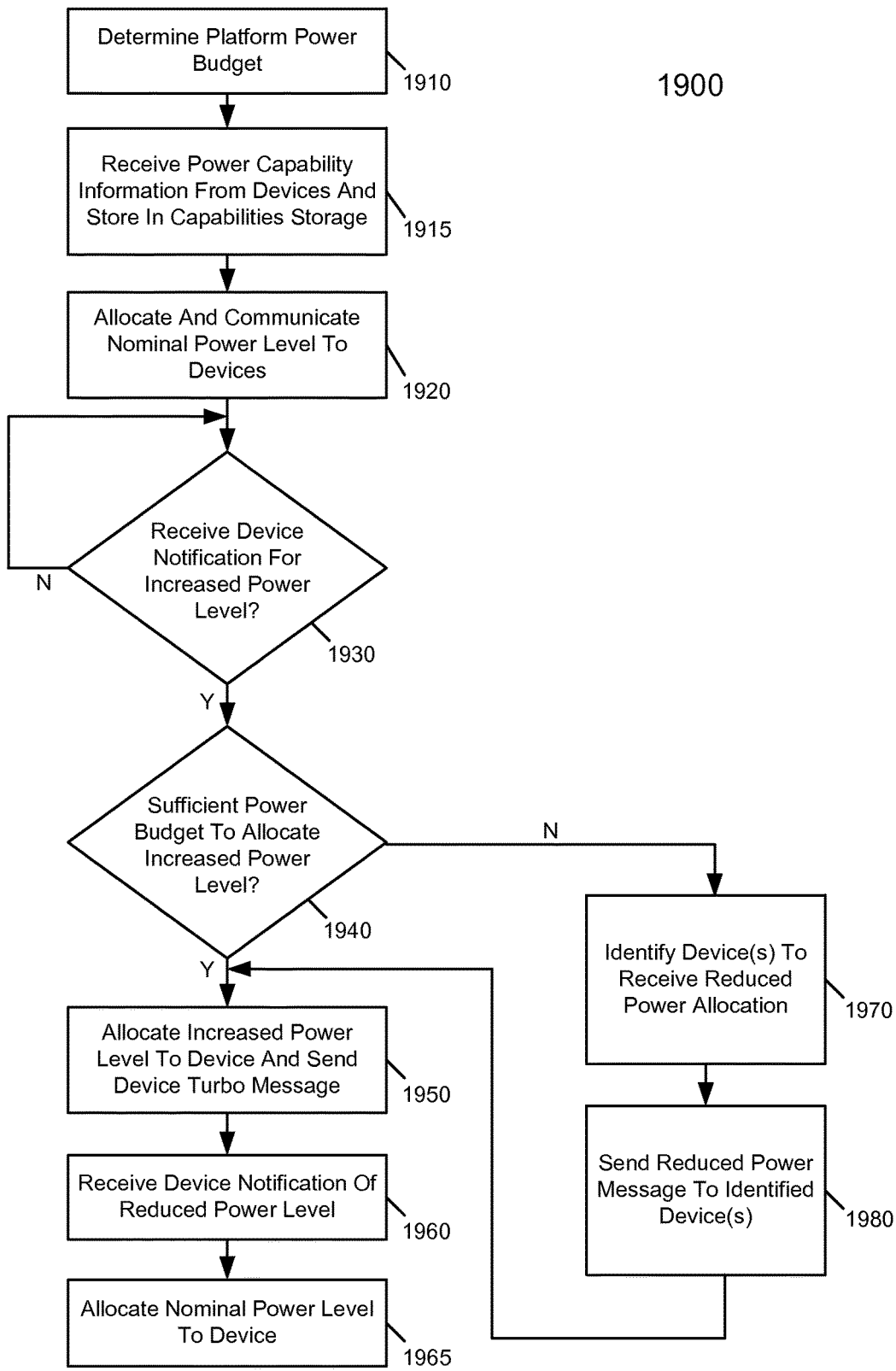
FIG. 19 is a flow diagram of a method in accordance with another embodiment of the present invention.

Referring now to FIG. 19, shown is a flow diagram of a method in accordance with another embodiment of the present invention. As shown in FIG. 19, method 1900 may be performed, e.g., by power allocation logic 1800 of FIG. 18. As shown, method 1900 begins by determining a platform power budget (block 1910). As an example, the platform power budget may be obtained from a configuration storage of the platform (such as a configuration storage of the processor itself). Next control passes to block 1915 where power capability information may be received from various devices of the platform and stored in a capabilities storage (block 1915). As discussed above, this power capability information may include at least 3 power levels (per time frame) at which a given device may operate in different modes. Next control passes to block 1920 where a nominal power level may be allocated and communicated to each device (block 1920). Thus at this point, the platform is configured for normal operation in which each device is allocated its nominal power level.

Still with reference to FIG. 19, it can be determined whether a device notification is received for an increased power level (diamond 1930). Note that this device notification may include various information such as an identification of a particular use case, a requested power level for such use case (e.g., in terms of Watts) as well as other information such as the length of use case or so forth.

When such device notification is received, control passes to diamond 1940 to determine whether a sufficient power budget exists to allocate the increased power level to this requesting device. This determination at block 1940 may be based on a comparison between the platform power budget and the total allocation of power to various devices of the platform. As an example, based upon the initial device allocation of a nominal level to each device, it is possible that there is power headroom available (which may be a dynamic value tracked and stored by the power allocation logic). In other cases, a system may be designed with minimal power headroom such that for a given power delivery system sized for the platform, no additional power headroom is available if all devices are operating at their nominal level.

In any event, at diamond 1940, it is determined whether sufficient power budget is available to allocate an increased power level to a requesting device. If so, control passes to block 1950 where the increased power level may be allocated to the device, and a device turbo message may be sent to this device. In an embodiment, the device turbo message may include various information, including an increased power level (e.g., a maximum power level for the device such as obtained from a capabilities storage), which may be communicated in terms of Watts. Additional information may be sent in the device turbo message, such as a length of time for which the device is allowed to operate at this increased power level, among other possible information such as how long before the device can request this mode again to provide a measure of hysteresis to prevent the same device from requesting and receiving device turbo mode at the cost of all other devices.

Still with reference to FIG. 19, assuming an embodiment in which a device notifies the power control logic when a particular use case is completed, control next passes to block 1960 where a device notification may be received for a reduced power level (which the device may autonomously enter upon completion of the use case, in an embodiment). This notification may take many different forms and in one embodiment may simply be an indication that the use case is completed. Thus at block 1965 a nominal power level may be allocated to this device, which optionally may be communicated to the device. The difference between the higher power consumption level and this nominal level may be added back to an available power headroom amount also. In addition, if any other devices were allocated a reduced power level to enable this use case to occur (to be described below), a re-allocation of a nominal power level for such devices also may occur at block 1965 (which can be communicated to the devices), along with appropriate updates to the available power headroom.

Still with reference to FIG. 19, if at diamond 1940 it is determined that an insufficient power budget is available to allocate an increased power level to a requesting device, control instead passes to block 1970 where one or more devices can be identified to receive a reduced power allocation to enable the use case to occur. In an embodiment, a power allocation logic may make reference to a use case table to determine, for the particular use case being requested by a requesting device, the devices to be involved in such use case and/or devices that may be suitably powered at a lower level for the use case, as described herein. Control next passes to block 1980, where a reduced power message may be sent to the identified device(s). In an embodiment, this reduced power message may include a reduced power level (e.g., a minimum power level) for the identified device(s), such as obtained from a capabilities storage. Understand that the identified device(s) may in some cases include or be the main processor itself such as when additional power is needed for a peripheral device use case (such as a combination of a flash device and a capture device). After this communication of one or more reduced power messages at block 1980, control passes to block 1950, discussed above. Understand while shown at this high level in the embodiment of FIG. 19, many variations and alternatives are possible.

The following examples pertain to further embodiments.

In one example, a processor comprises: at least one core to execute instructions; and a power control logic coupled to the at least one core to receive power capability information from a plurality of devices to couple to the processor and allocate a platform power budget to the plurality of devices, set a first power level for each of the plurality of devices at which the corresponding device is allocated to be powered, communicate the first power level to each of the plurality of devices, and dynamically reduce a first power to be allocated to a first device and increase a second power to be allocated to a second device responsive to a request from the second device for a higher power level.

In an example, responsive to the request from the second device, the power control logic is to send a first message to the first device to cause the first device to operate at a third power level less than the first power level, and send a second message to the second device to cause the second device to operate at a second power level greater than the first power level.

In an example, the power control logic is to send the second message to enable the second device to execute a use case.

In an example, the second device comprises a flash device and the use case comprises an illumination of the flash device to enable a user to capture an image via a capture device.

In an example, after execution of the use case, the power control logic is to set the first power level for each of the plurality of devices and communicate the first power level to each of the plurality of devices.

In an example, the power control logic is to send the first message to a data communication device to cause a communication frequency of the data communication device to be reduced during the use case.

In an example, the first power level is to be different for at least some of the plurality of devices.

In an example, the power capability information includes the first power level, a second power level, and a third power level for each of a plurality of time frames, the power capability information to be communicated from each of the plurality of devices to the power control logic.

In an example, the first power level comprises a nominal power level at which the corresponding device is to operate, the second power level comprises a maximum power level at which the corresponding device is to operate, and the third power level comprises a minimum power level at which the corresponding device is to operate.

Note that the above processor can be implemented using various means.

In an example, the processor comprises a SoC incorporated in a user equipment touch-enabled device.

In another example, a system comprises a display and a memory, and includes the processor of one or more of the above examples.

In another example, a method comprises: allocating, via a power allocation logic of a processor, a nominal power level for each of a plurality of devices of a platform, the platform including the processor; receiving a device notification from a first device of the plurality of devices for an increased power level; and allocating the increased power level to the first device, to enable the first device to perform an operation of a first use case.

In an example, the method further comprises determining whether available power headroom exists to allocate the increased power level, and if not, identifying one or more other devices of the plurality of devices to receive a reduced power allocation, and sending a reduced power message to the one or more other devices.

In an example, the method further comprises allocating the increased power level to the first device and sending a device turbo message to the first device after sending the reduced power message, where the first device is to update one or more operating parameters of the first device to operate at the increased power level.

In an example, the method further comprises receiving power capability information from the plurality of devices and storing the power capability information in a capabilities storage.

In an example, the method further comprises accessing the capabilities storage to determine the increased power level for the first device, and determining whether available power headroom exists to allocate the increased power level based at least in part on the increased power level.

In an example, the method further comprises receiving an indication of the first use case with the device notification, and accessing a storage associated with the first use case.

In an example, the method further comprises identifying at least one device of the plurality of devices to receive a reduced power allocation responsive to use case information stored in the storage associated with the first use case.

In another example, a computer readable medium including instructions is to perform the method of any of the above examples.

In another example, a computer readable medium including data is to be used by at least one machine to fabricate at least one integrated circuit to perform the method of any one of the above examples.

In another example, an apparatus comprises means for performing the method of any one of the above examples.

In another example, a system comprises: a processor including a plurality of cores each to independently execute instructions and a power control unit to control a power consumption of the plurality of cores; a plurality of devices coupled to the processor, each of the plurality of devices including a capabilities storage to store a plurality of power levels at which the corresponding device is to operate in an associated operating mode, and a control logic to receive a power allocation message and to control one or more operating parameters of the corresponding device to enable operation at a power level associated with the power allocation message; and a power controller including a power allocation logic to receive the plurality of power levels from the plurality of devices, allocate a power budget to the plurality of devices, send the power allocation message to each of the plurality of devices including a first power level at which the corresponding device is allocated to be powered, and dynamically update a power to be allocated to a first device responsive to a notification from the first device regarding a use scenario to be performed on the first device.

In an example, the system further comprises a storage to store a plurality of entries each associated with a use scenario, where the power controller is to access an entry of the storage responsive to the notification and identify at least one device of the plurality of devices to receive a reduced power allocation responsive to use case information stored in the entry of the storage.

In an example, the system further comprises a second capabilities storage to store the plurality of power levels for the plurality of devices, where responsive to the notification, the power allocation logic is to access the second capabilities storage, obtain the plurality of power levels for the first device, determine an updated power level for the first device for the use scenario, and send an updated power allocation message with the updated power level to the first device.

In an example, the power control unit comprises the power controller.

In an example, at least some of the plurality of devices comprise intellectual property logics of the processor.

Understand that various combinations of the above examples are possible.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
   at least one core to execute instructions; and
   a power control logic coupled to the at least one core to:
   receive power capability information from a plurality of devices to couple to the processor,
   allocate a platform power budget to the plurality of devices,
   for each of the plurality of devices, determine an initial power level at which the corresponding device is allocated to be powered,
   responsive to a request from a first device of the plurality of devices for a higher power level, access a first entry of a use case storage including a plurality of entries each associated with a unique use case, the first entry identifying a first set of multiple devices involved in a first use case, the first set including the first device of the plurality of devices,
   using first use case information stored in the first entry of the storage:
   identify a second device of the plurality of devices to receive a reduced power allocation, and
   dynamically increase a first power level to be allocated to the first device and reduce a second power level to be allocated to the second device.

2. The processor of claim 1, wherein responsive to the request from the first device, the power control logic is to send a first message to the first device to cause the first device to operate at the increased first power level, and send a second message to the second device to cause the second device to operate at the reduced second power level.

3. The processor of claim 1, the first entry further identifying a second set of multiple devices that are not involved in the first use case, wherein the second device is included in the second set identified by the first entry.

4. The processor of claim 1, wherein the first device comprises a flash device, and the first use case comprises an illumination of the flash device to enable a user to capture an image via a capture device.

5. The processor of claim 1, wherein after execution of the first use case, the power control logic is to cause each of the plurality of devices to operate at the corresponding initial power level.

6. The processor of claim 2, wherein the second device comprises a data communication device, and the second message is to cause a communication frequency of the data communication device to be reduced during the first use case.

7. The processor of claim 1, wherein the plurality of entries of the use case storage correspond to a plurality of use cases, wherein each entry includes information identifying at least one device to be active during a corresponding use case.

8. The processor of claim 1, wherein the power capability information includes the first power level, a fourth power level, and a fifth power level for each of a plurality of time frames, the power capability information to be communicated from each of the plurality of devices to the power control logic.

9. The processor of claim 8, wherein the first power level comprises a nominal power level at which the corresponding device is to operate, the fourth power level comprises a maximum power level at which the corresponding device is to operate, and the fifth power level comprises a minimum power level at which the corresponding device is to operate.

10. A non-transitory machine-readable medium having stored thereon data, which if used by at least one machine, causes the at least one machine to fabricate at least one integrated circuit to perform a method comprising:
   allocating, via a power allocation logic of a processor, a nominal power level for each of a plurality of devices of a platform, the platform including the processor;
   receiving a device notification from a first device of the plurality of devices for an increased power level;
   responsive to the device notification from the first device, accessing a first entry of a use case storage including a plurality of entries, each of the plurality of entries associated with a unique use case, the first entry identifying a first set of multiple devices involved in a first use case, the first set including the first device of the plurality of devices;
   using first use case information stored in the first entry of the storage:

identifying a second device of the plurality of devices to receive a reduced power allocation; and reducing a power level of the second device and allocating the increased power level to the first device to enable the first device to perform an operation of the first use case.

11. The machine-readable medium of claim 10, wherein the method further comprises sending a reduced power message to the second device.

12. The machine-readable medium of claim 11, wherein the method further comprises allocating the increased power level to the first device and sending a device turbo message to the first device after sending the reduced power message, wherein the first device is to update one or more operating parameters of the first device to operate at the increased power level.

13. The machine-readable medium of claim 10, wherein the method further comprises receiving power capability information from the plurality of devices and storing the power capability information in a capabilities storage.

14. The machine-readable medium of claim 13, wherein the method further comprises accessing the capabilities storage to determine the increased power level for the first device, and determining whether available power headroom exists to allocate the increased power level based at least in part on the increased power level.

15. The machine-readable medium of claim 10, wherein the method further comprises receiving an indication of the first use case with the device notification.

16. The machine-readable medium of claim 15, wherein the plurality of entries of the use case storage correspond to a plurality of use cases, wherein each entry includes information identifying at least one device to be active during a corresponding use case.

17. A system comprising:
a processor including a plurality of cores each to independently execute instructions and a power control unit to control a power consumption of the plurality of cores;
a plurality of devices coupled to the processor, each of the plurality of devices including a capabilities storage to store a plurality of power levels at which the corresponding device is to operate in an associated operating mode, and a control logic to receive a power allocation message and to control one or more operating parameters of the corresponding device to enable operation at a power level associated with the power allocation message;
a power controller including a power allocation logic to receive the plurality of power levels from the plurality of devices, allocate a power budget to the plurality of devices, send the power allocation message to each of the plurality of devices including a first power level at which the corresponding device is allocated to be powered, and dynamically update a power to be allocated to a first device responsive to a notification from the first device regarding a first use scenario to be performed using the first device; and
a storage to store a plurality of entries each associated with a use scenario, wherein the power controller is to access a first entry of the storage responsive to the notification, the first entry identifying a first set of multiple devices involved in the first use scenario, wherein the first set includes the first device of the plurality of devices, wherein the power controller is to identify a second device of the plurality of devices to receive a reduced power allocation based on using the first entry of the storage.

18. The system of claim 17, further comprising a second capabilities storage to store the plurality of power levels for the plurality of devices, wherein responsive to the notification, the power allocation logic is to access the second capabilities storage, obtain the plurality of power levels for the first device, determine an updated power level for the first device for the use scenario, and send an updated power allocation message with the updated power level to the first device.

19. The system of claim 17, wherein the power control unit comprises the power controller.

20. The system of claim 17, the first entry further identifying a second set of multiple devices that are not involved in the first use case, wherein the second device is included in the second set identified by the first entry.

21. The system of claim 19, wherein the plurality of entries of the storage correspond to a plurality of use cases, wherein each entry includes information identifying at least one device to be active during a corresponding use case.

* * * * *